US012650409B2

(12) United States Patent
Vasisht et al.

(10) Patent No.: US 12,650,409 B2
(45) Date of Patent: Jun. 9, 2026

(54) ACOUSTIC SIGNATURE MANAGEMENT ENGINE IN AN OBJECT INTEGRITY SENSING SYSTEM

(71) Applicant: MICROSOFT TECHNOLOGY LICENSING, LLC, Redmond, WA (US)

(72) Inventors: Deepak Vasisht, Champaign, IL (US); Ranveer Chandra, Kirkland, WA (US); Manikanta Kotaru, Kenmore, WA (US); Nissanka Arachchige Bodhi Priyantha, Redmond, WA (US); Akshay Sanjay Gadre, Pittsburgh, PA (US); Nikunj Raghuvanshi, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 950 days.

(21) Appl. No.: 17/362,756

(22) Filed: Jun. 29, 2021

(65) Prior Publication Data

US 2022/0412923 A1     Dec. 29, 2022

(51) Int. Cl.
*G01N 29/14*          (2006.01)
*G01N 29/44*          (2006.01)

(52) U.S. Cl.
CPC ......... *G01N 29/14* (2013.01); *G01N 29/4427* (2013.01); *G01N 29/4454* (2013.01); *G01N 2291/2695* (2013.01)

(58) Field of Classification Search
CPC .............. G01N 29/14; G01N 29/4427; G01N 29/4454; G01N 2291/2695;
(Continued)

(56) References Cited

U.S. PATENT DOCUMENTS

| | | | |
|---|---|---|---|
| 4,435,984 A | | 3/1984 | Gruber |
| 4,821,573 A | * | 4/1989 | Nagata .................... G01N 33/02 |
| | | | 73/52 |
| 2021/0175553 A1 | * | 6/2021 | Van Tassell ........... G01N 29/12 |

FOREIGN PATENT DOCUMENTS

WO          2017124017 A2     7/2017

OTHER PUBLICATIONS

"Ultrasonics and Acoustics" by David R. Andrews (Year: 2003).*
(Continued)

*Primary Examiner* — Xin Y Zhong
(74) *Attorney, Agent, or Firm* — Shook Hardy & Bacon L.L.P.

(57)          ABSTRACT

Methods, systems, and computer storage media for providing an indication of an integrity of an object based on a non-invasive assessment of the integrity of the object using acoustic signature management engine in object integrity sensing system. In operation, an aggregate object-intermediate-medium sound of an object in an intermediate medium is detected (e.g., via sensors). An acoustic signature of the aggregate object-intermediate-medium sound is generated as a processed acoustic channel associated with statistical measurements. A reference acoustic signature of the object and intermediate medium is accessed. The reference acoustic signature is associated with an acoustic signature computation model, that generates reference acoustic signatures based on a mean and standard deviation measurements of input signals transmitted through the object and intermediate medium. A determination whether the object has impaired integrity is determined based on a quantified difference between the acoustic signature of the aggregate object-intermediate-medium sound and the reference acoustic signature.

20 Claims, 11 Drawing Sheets

(58) Field of Classification Search
CPC ............. G01N 2291/102; G01N 29/12; G01N
29/343; G01N 29/348; G01N 2291/0258;
G01N 29/4436; G01N 29/4472; G01N
29/46; G01N 29/043
See application file for complete search history.

(56) References Cited

OTHER PUBLICATIONS

"International Search Report and Written Opinion Issued in PCT Application No. PCT/US22/030145", Mailed Date: Aug. 10, 2022, 11 Pages.
Zuckerwar, et al., "Development of a Piezopolymer Pressure Sensor for a Portable Fetal Heart Rate Monitor", In Journal of IEEE Transactions on biomedical engineering, vol. 40, No. 9, Sep. 1993, pp. 963-969.
Zidane, et al., "Nondestructive Control of Fruit Quality via Millimeter Waves and Classification Techniques: Investigations in the Automated Health Monitoring of Fruits", In Journal of IEEE Antennas and Propagation Magazine, vol. 62, No. 5, Oct. 2020, pp. 43-54.
Xu, et al., "Breathlistener: Fine-Grained Breathing Monitoring in Driving Environments Utilizing Acoustic Signals", In Proceedings of the 17th Annual International Conference on Mobile Systems, Applications, and Services, Jun. 17, 2019, pp. 54-66.
Wang, et al., "Using Smart Speakers to Contactlessly Monitor Heart Rhythms", In Journal of Communications biology, vol. 4, No. 1, Mar. 9, 2021, pp. 1-12.
Wang, et al., "Contactless Infant Monitoring Using White Noise", In The 25th Annual International Conference on Mobile Computing and Networking, Oct. 21, 2019, 16 Pages.
Wells, PeterN. , "Ultrasound Imaging", In Journal of Physics in Medicine & Biology, vol. 51, No. 13, Jun. 20, 2006, pp. 83-98.
"Customer Review for 10 Strawberry Street", Retrieved From: https://www.amazon.com/10-Strawberry-Street-CATERING-12-MUGW-Catering/dp/B002LADYR8/ref=sr_1_10?dchild=1&keywords=10+Strawberry+Street&qid=1616733044&sr=8-10#customerReviews, Nov. 29, 2009, 8 Pages.
"How Much a Damaged Pack can Really Cost your Business", Retrieved From: https://www.amcor.com/insights/blogs/how-much-a-damaged-pack-can-really-cost-your-business, Feb. 3, 2020, 9 Pages.
"Introduction to SIFT (Scale-Invariant Feature Transform)", Retrieved From: https://web.archive.org/web/20210127040200/https://opencv-python-tutroals.readthedocs.io/en/latest/py_tutorials/py_feature2d/py_sift_intro/py_sift_intro.html, Jan. 27, 2021, 5 Pages.
"Sensor Array", Retrieved From: https://en.wikipedia.org/wiki/Sensor_array, Mar. 10, 2021, 7 Pages.
"Tableware Market Size", Retrieved From: https://www.grandviewresearch.com/industry-analysis/tableware-market, Jun. 2019, 6 Pages.
Adib, et al., "See Through Walls with Wi-Fi!", In Proceedings of the ACM SIGCOMM 2013 Conference on SIGCOMM, Aug. 12, 2013, pp. 75-86.
Arenga, et al., "Ripeness Classification of Cocoa Through Acoustic Sensing and Machine Learning", In IEEE 9th International Conference on Humanoid, Nanotechnology, Information Technology, Communication and Control, Environment and Management (HNICEM), Dec. 1, 2017, pp. 1-6.
Baranoski, EdwardJ. , "Through-Wall Imaging: Historical Perspective and Future Directions", In Journal of the Franklin Institute, vol. 345, No. 6, pp. 5173-5176.
Bui, et al., "eBP: A Wearable System for Frequent and Comfortable Blood Pressure Monitoring from User's Ear", In The 25th Annual International Conference on Mobile Computing and Networking, Oct. 21, 2019, 17 Pages.
Cao, et al., "Earphonetrack: Involving Earphones Into the Ecosystem of Acoustic Motion Tracking", In Proceedings of the 18th Conference on Embedded Networked Sensor Systems, Nov. 16, 2020, pp. 95-108.

Carver, et al., "AmphiLight: Direct Air-Water Communication with Laser Light", In 17th USENIX Symposium on Networked Systems Design and Implementation (NSDI), Feb. 25, 2020, pp. 373-388.
Chauhan, et al., "BreathPrint: Breathing Acoustics-Based User Authentication", In Proceedings of the 15th Annual International Conference on Mobile Systems, Applications, and Services, Jun. 19, 2017, pp. 278-291.
Chen, et al., "Your Table Can Be an Input Panel: Acoustic-based Device-Free Interaction Recognition", In Proceedings of the ACM on Interactive, Mobile, Wearable and Ubiquitous Technologies, vol. 3, No. 1, Mar. 2019, pp. 1-21.
Tonolini, et al., "Networking Across Boundaries: Enabling Wireless Communication through the Water-Air Interface", In Proceedings of the Conference of the ACM Special Interest Group on Data Communication, Aug. 20, 2018, pp. 117-131.
Corbishley, et al., "Breathing Detection: Towards a Miniaturized, Wearable, Battery-Operated Monitoring", In Journal of IEEE Transactions on Biomedical Engineering, vol. 55, No. 1, Jan. 2008, pp. 196-204.
Dalen, et al., "3-D Imaging, Analysis and Modelling of Porous Cereal Products Using X-Ray Microtomography", In Journal of Image Analysis & Stereology, vol. 26, No. 3, Nov. 3, 2007, pp. 169-177.
Dutta, et al., "A Nonlinear Acoustic Technique for Crack Detection in Metallic Structures", In Journal of Structural Health Monitoring, vol. 8, No. 3, Mar. 13, 2009, pp. 1-12.
Eriksson, et al., "The Pothole Patrol: Using a Mobile Sensor Network for Road Surface Monitoring", In Proceedings of the 6th international conference on Mobile systems, applications, and services, Jun. 17, 2008, pp. 29-39.
Singh, et al., "Sense through Wall Human Detection Using UWB Radar", In EURASIP Journal on Wireless Communications and Networking, No. 1, Jun. 21, 2011, pp. 1-11.
Teodorescu, et al., "The Age of Big Data Analytics: How Big Data is Reshaping the Insurance Industry", In paper of Collaboration in Higher Education for Digital Transformation in European Business, Sep. 18, 2019, pp. 1-17.
Gong, et al., "Detection of Emerging Through-Wall Cracks for Pipe Break Early Warning in Water Distribution Systems Using Permanent Acoustic Monitoring and Acoustic Wave Analysis", In Journal of Water Resources Management, vol. 34, Jun. 2020, pp. 1-26.
Heck, et al., "Rethinking Packaging: a DHL Perspective on the Future of Packaging in the Logistics Industry", Retrieved From: https://www.dhl.com/content/dam/dhl/global/core/documents/pdf/glo-core-rethinking-packaging-trend-report.pdf, 2019, pp. 1-39.
Hertlin, et al., "Acoustic Resonance Analysis in Manufacturing", Retrieved From: https://www.ndt.net/article/v05n01/hertlin/hertlin.htm, Jan. 2000, 5 Pages.
Hu, et al., "Underwater Motion and Activity Recognition using Acoustic Wireless Networks", In ICC IEEE International Conference on Communications (ICC), Jun. 7, 2020, 7 Pages.
Iravantchi, et al., "Interferi: Gesture Sensing Using On-Body Acoustic Interferometry", In Proceedings of the CHI Conference on Human Factors in Computing Systems, May 4, 2019, 13 Pages.
Karanam, et al., "3D Through-Wall Imaging with Unmanned Aerial Vehicles using WiFi", In 16th ACM/IEEE International Conference on Information Processing in Sensor Networks (IPSN), Apr. 18, 2017, pp. 131-142.
Kim, et al., "Detection of Pinholes in Almonds through X-Ray Imaging", In Journal of Transactions of the ASAE, vol. 44, No. 4, Mar. 2001, pp. 997-1003.
Santagati, et al., "Experimental Evaluation of Impulsive Ultrasonic Intra-Body Communications for Implantable Biomedical Devices", In Journal of IEEE Transactions on Mobile Computing, vol. 16, No. 2, May 2, 2016, pp. 1-14.
Klucinec, Brian, "The Effectiveness of the Aquaflex Gel Pad in the Transmission of Acoustic Energy", In Journal of athletic training, vol. 31, No. 4, Dec. 1996, pp. 313-317.
Korany, et al., "Xmodal-Id: Using Wifi for through-Wall Person Identification from Candidate Video Footage", In The 25th Annual International Conference on Mobile Computing and Networking, Oct. 21, 2019, 15 Pages.

(56)          References Cited

OTHER PUBLICATIONS

Kotwaliwale, et al., "X-Ray Imaging Methods for Internal Quality Evaluation of Agricultural Produce", In Journal of food science and technology, vol. 51, No. 1, Jan. 2014, pp. 1-15.

Lee, et al., "Evaluation of the Firmness Measurement of Fruit by Using a Non-Contact Ultrasonic Technique", In IEEE 8th Conference on Industrial Electronics and Applications (ICIEA), Jun. 19, 2013, pp. 1331-1336.

Li, et al., "Discrete Wavelet Transform for Tool Breakage Monitoring", In International Journal of Machine Tools and Manufacture, vol. 39, No. 12, Feb. 1, 1999, pp. 1935-1944.

Li, et al., "Wavespy: Remote and Through-Wall Screen Attack Via Mmwave Sensing", In IEEE Symposium on Security and Privacy (SP), May 18, 2020, pp. 217-232.

Liu, et al., "A Comparison of Acoustic Emission and Vibration on Bearing Fault Detection", In Proceedings of International Conference on Transportation, Mechanical, and Electrical Engineering (TMEE), Dec. 16, 2011, pp. 922-926.

Roy, et al., "Ripple {II}: Faster Communication through Physical Vibration", In 13th USENIX Symposium on Networked Systems Design and Implementation (NSDI), Mar. 16, 2016, pp. 671-684.

Liu, et al., "Indoor Acoustic Localization: A Survey", In Journal of Human-centric Computing and Information Sciences, vol. 10, No. 1, Jan. 6, 2020, pp. 1-24.

Liu, et al., "VibSense: Sensing Touches on Ubiquitous Surfaces through Vibration", In 14th Annual IEEE International Conference on Sensing, Communication, and Networking (SECON), Jun. 12, 2017, 9 Pages.

Lu, et al., "Lip Reading-Based User Authentication through Acoustic Sensing on Smartphones", In Journal of IEEE/ACM Transactions on Networking, vol. 27, No. 1, Feb. 2019, pp. 447-460.

Mao, et al., "Aim: Acoustic Imaging on a Mobile", In Proceedings of the 16th Annual International Conference on Mobile Systems, Applications, and Services, Jun. 10, 2018, pp. 468-481.

Mao, et al., "Mobile Imaging Using Acoustic Signals", In Journal of GetMobile: Mobile Computing and Communications, vol. 22, No. 4, Dec. 2018, pp. 35-38.

Roy, et al., "Listening through a Vibration Motor", In Proceedings of the 14th Annual International Conference on Mobile Systems, Applications, and Services, Jun. 25, 2016, pp. 57-69.

Mizuno, et al., "New Applications of Millimeter-Wave Incoherent Imaging", In Conference of IEEE MTT-S International Microwave Symposium Digest, Jun. 17, 2005, pp. 629-632.

Mohan, et al., "Crack Detection Using Image Processing: A Critical Review and Analysis", In Alexandria Engineering Journal, vol. 57, No. 2, Jun. 2018, pp. 787-798.

Parker, et al., "Distributed Acoustic Sensing—A New Tool for Seismic Applications", In Article of first break, vol. 32, No. 2, Feb. 2014, pp. 61-69.

Pham, et al., "Wake: A Behind-The-Ear Wearable System for Microsleep Detection", In Proceedings of the 18th International Conference on Mobile Systems, Applications, and Services, Jun. 15, 2020, pp. 404-418.

Prabhakara, et al., "Osprey: A mmWave Approach to Tire Wear Sensing", In Proceedings of the 18th International Conference on Mobile Systems, Applications, and Services, Jun. 15, 2020, pp. 28-41.

Pu, et al., "Whole-Home Gesture Recognition Using Wireless Signals", In Proceedings of the 19th annual international conference on Mobile computing & networking, Sep. 30, 2013, pp. 27-38.

Reiten, et al., "Laser Doppler Vibrometry Use in Detecting Faulty Printed Circuit Boards", In IEEE International Automatic Testing Conference, AutoTestCon, Sep. 8, 2008, 4 Pages.

Roy, "Backdoor: Making Microphones Hear Inaudible Sounds", In Proceedings of the 15th Annual International Conference on Mobile Systems, Applications, and Services, Jun. 19, 2017, pp. 2-14.

Communication pursuant to Article 94(3) EPC received for EP Application No. 22731879.7, mailed on Mar. 3, 2026, 06 pages.

\* cited by examiner

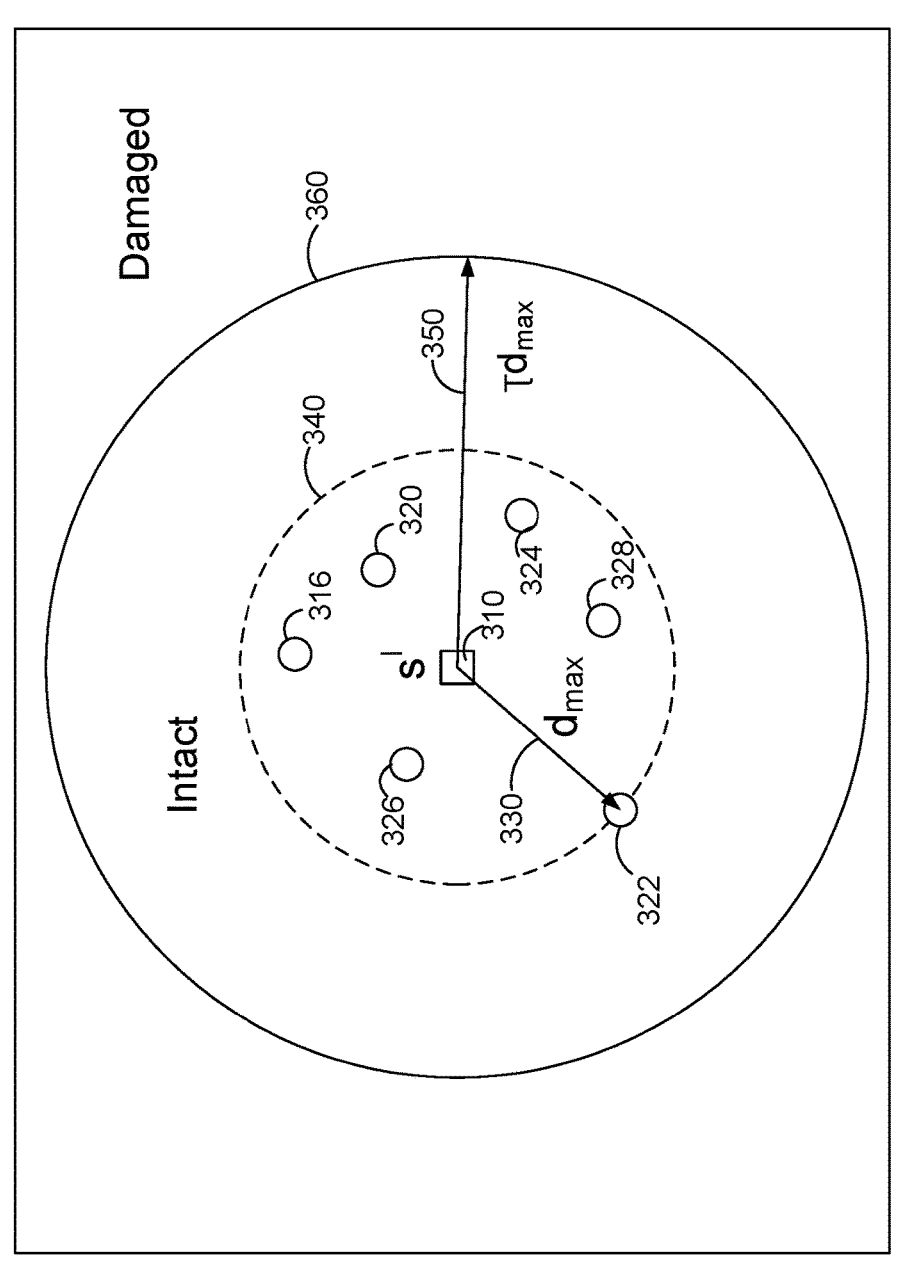
FIG. 3

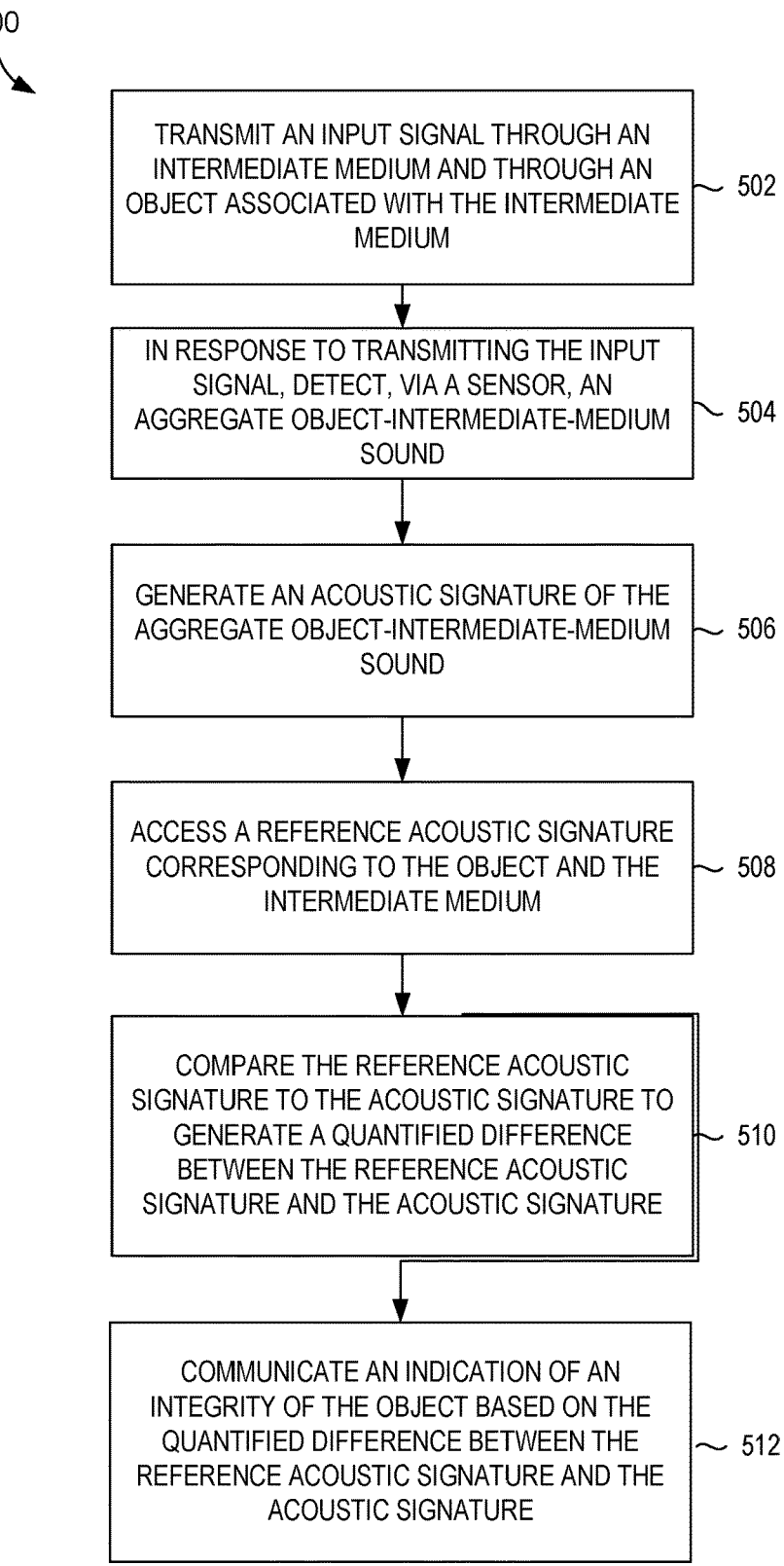

500

TRANSMIT AN INPUT SIGNAL THROUGH AN INTERMEDIATE MEDIUM AND THROUGH AN OBJECT ASSOCIATED WITH THE INTERMEDIATE MEDIUM    ~ 502

IN RESPONSE TO TRANSMITTING THE INPUT SIGNAL, DETECT, VIA A SENSOR, AN AGGREGATE OBJECT-INTERMEDIATE-MEDIUM SOUND    ~ 504

GENERATE AN ACOUSTIC SIGNATURE OF THE AGGREGATE OBJECT-INTERMEDIATE-MEDIUM SOUND    ~ 506

ACCESS A REFERENCE ACOUSTIC SIGNATURE CORRESPONDING TO THE OBJECT AND THE INTERMEDIATE MEDIUM    ~ 508

COMPARE THE REFERENCE ACOUSTIC SIGNATURE TO THE ACOUSTIC SIGNATURE TO GENERATE A QUANTIFIED DIFFERENCE BETWEEN THE REFERENCE ACOUSTIC SIGNATURE AND THE ACOUSTIC SIGNATURE    ~ 510

COMMUNICATE AN INDICATION OF AN INTEGRITY OF THE OBJECT BASED ON THE QUANTIFIED DIFFERENCE BETWEEN THE REFERENCE ACOUSTIC SIGNATURE AND THE ACOUSTIC SIGNATURE    ~ 512

FIG. 5

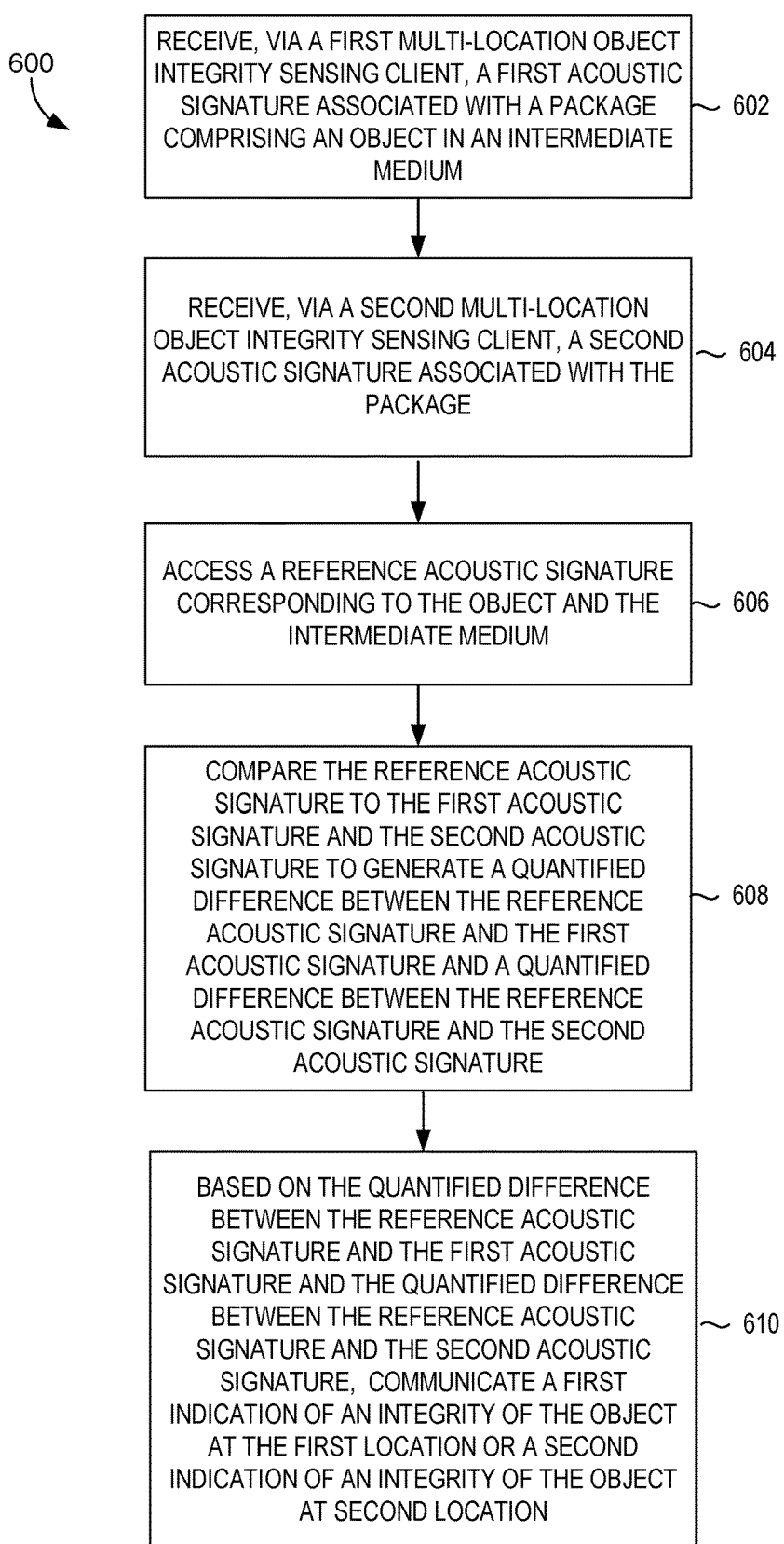

600

RECEIVE, VIA A FIRST MULTI-LOCATION OBJECT INTEGRITY SENSING CLIENT, A FIRST ACOUSTIC SIGNATURE ASSOCIATED WITH A PACKAGE COMPRISING AN OBJECT IN AN INTERMEDIATE MEDIUM ~ 602

RECEIVE, VIA A SECOND MULTI-LOCATION OBJECT INTEGRITY SENSING CLIENT, A SECOND ACOUSTIC SIGNATURE ASSOCIATED WITH THE PACKAGE ~ 604

ACCESS A REFERENCE ACOUSTIC SIGNATURE CORRESPONDING TO THE OBJECT AND THE INTERMEDIATE MEDIUM ~ 606

COMPARE THE REFERENCE ACOUSTIC SIGNATURE TO THE FIRST ACOUSTIC SIGNATURE AND THE SECOND ACOUSTIC SIGNATURE TO GENERATE A QUANTIFIED DIFFERENCE BETWEEN THE REFERENCE ACOUSTIC SIGNATURE AND THE FIRST ACOUSTIC SIGNATURE AND A QUANTIFIED DIFFERENCE BETWEEN THE REFERENCE ACOUSTIC SIGNATURE AND THE SECOND ACOUSTIC SIGNATURE ~ 608

BASED ON THE QUANTIFIED DIFFERENCE BETWEEN THE REFERENCE ACOUSTIC SIGNATURE AND THE FIRST ACOUSTIC SIGNATURE AND THE QUANTIFIED DIFFERENCE BETWEEN THE REFERENCE ACOUSTIC SIGNATURE AND THE SECOND ACOUSTIC SIGNATURE, COMMUNICATE A FIRST INDICATION OF AN INTEGRITY OF THE OBJECT AT THE FIRST LOCATION OR A SECOND INDICATION OF AN INTEGRITY OF THE OBJECT AT SECOND LOCATION ~ 610

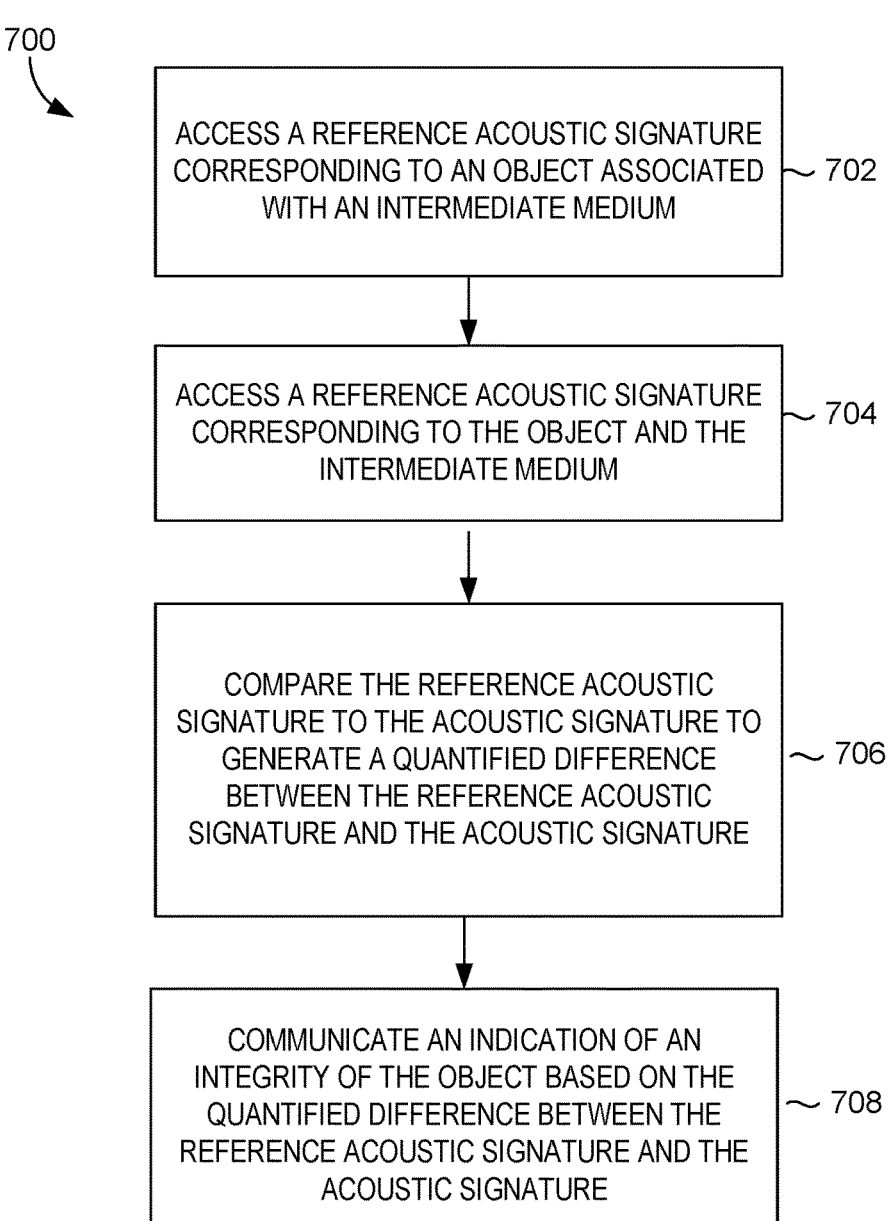

ACCESS A REFERENCE ACOUSTIC SIGNATURE CORRESPONDING TO AN OBJECT ASSOCIATED WITH AN INTERMEDIATE MEDIUM ～ 702

ACCESS A REFERENCE ACOUSTIC SIGNATURE CORRESPONDING TO THE OBJECT AND THE INTERMEDIATE MEDIUM ～ 704

COMPARE THE REFERENCE ACOUSTIC SIGNATURE TO THE ACOUSTIC SIGNATURE TO GENERATE A QUANTIFIED DIFFERENCE BETWEEN THE REFERENCE ACOUSTIC SIGNATURE AND THE ACOUSTIC SIGNATURE ～ 706

COMMUNICATE AN INDICATION OF AN INTEGRITY OF THE OBJECT BASED ON THE QUANTIFIED DIFFERENCE BETWEEN THE REFERENCE ACOUSTIC SIGNATURE AND THE ACOUSTIC SIGNATURE ～ 708

FIG. 7

ACOUSTIC SIGNATURE MANAGEMENT ENGINE IN AN OBJECT INTEGRITY SENSING SYSTEM

BACKGROUND

Users rely on opening and inspecting packages manually to check on object integrity. For example, a product inspector of a company has to physically inspect packages to determine if the products in the packages are still intact or broken. Object integrity sensing systems may support automating object integrity sensing in order to determine whether a product is impaired. For example, an object integrity sensing system may use a Radio Frequency (RF) signal to identify cracks on a product, when the product is unobstructed or un-occluded—in other words, when the product is not in a package. An object integrity sensing system can also use acoustic vibrometry (e.g., for broken railroads) to determine an impaired integrity (e.g., an extent of damage) of an object. For example, acoustic vibrometry can be performed using probes—that are physically attached to objects—to determine the impaired integrity of the object.

Conventionally, object integrity sensing systems are not configured with computing logic for detecting object integrity when the object is packaged or enclosed in an intermediate medium (e.g., box). For example, RF signal systems do not have the ability to detect or measure object shears or sub-millimeter cracks, which are common forms of damage in fragile products. Object integrity sensing systems that are based on acoustic vibrometry require time-consuming and carefully calibrated equipment—along with physical access to the object—to determine whether the object is impaired. As such, a more comprehensive object integrity sensing system—with an alternative basis for performing object integrity sensing operations—can improve computing operations and interfaces in an object integrity sensing system.

SUMMARY

Various aspects of technology described herein are generally directed to systems, methods, and computer storage media for, among other things, providing an indication of an integrity of an object—based on a non-invasive assessment of the integrity of the object—using acoustic signature management engine in object integrity sensing system. An indication of the integrity of an object (e.g., an impaired integrity of an object) can refer to a quantified amount of damage relative to the object in an undamaged state. The acoustic signature management engine supports a training phase and an execution phase that support, firstly, generating a reference acoustic signature corresponding to an object in an intermediate medium, and secondly, generating an acoustic signature of the object in the intermediate medium (e.g., in a supply chain), respectively. The acoustic signature is compared to the reference acoustic signature such that an indication of an integrity of the object—based on the quantified difference between the reference acoustic signature and the acoustic signature—is communicated.

Conventionally, object integrity sensing systems are not configured with computing logic for detecting object integrity when the object is packaged. A technical solution—to the limitations of conventional object integrity sensing systems—provides an indication of an integrity of an object based on a non-invasive assessment of the integrity of the object. In operation, an aggregate object-intermediate-medium sound—associated with both an object and an intermediate medium (collectively referred to herein as "package")— is accessed. The aggregate object-intermediate-medium sound can be generated while the package is in a supply chain. An acoustic signature associated with the aggregate object-intermediate-medium sound is generated. A reference acoustic signature corresponding to the object and the intermediate medium is accessed. The reference acoustic signature was previously generated—during a training phase—via an acoustic signature computation model. The acoustic signature computation model generates acoustic signatures—including the reference acoustic signature—based on mean and variance measurements associated with input signals transmitted through the intermediate medium and through the object. The reference acoustic signature is compared to the acoustic signature to generate a quantified difference between the acoustic signature of the aggregate object-intermediate-medium sound and the reference acoustic signature. An indication of an integrity of the object—based on the quantified difference between the reference acoustic signature and the acoustic signature—is communicated.

In addition, the object integrity sensing system supports a training phase—associated with detecting aggregate object-intermediate-medium sounds and generating reference acoustic signatures—and an execution phase—associated with detecting aggregate object-intermediate-medium sounds and generating acoustic signatures in real-time. During a training phase (e.g., via an acoustic signature computation model), a first aggregate object-intermediate-medium sound is used to generate a reference acoustic signature, and during an execution phase, a second aggregate object-intermediate-medium sound is used to generate an acoustic signature. In operation, a transducer is positioned to optimally transmit an input signal through an intermediate medium and an object. In response to transmitting the input signal, a microphone is used to detect an aggregate object-intermediate-medium sound that is used to generate the reference acoustic signature during the training phase—and an acoustic signature, during an execution phase. In this way, determining whether the object has impaired integrity is based on a quantified difference between the reference acoustic signature and the acoustic signature.

Moreover, the object integrity sensing system provides a multi-location object integrity sensing engine that provides object integrity data with reference to different locations along a supply chain. For example, a package may be shipped to multiple warehouses in the supply chain and the multi-location object integrity sensing engine supports location-based object integrity comparisons and indications of the integrity of the object. As such, damage to an object that occurs while an object is traveling along the supply chain can be attributed to the appropriate location where the damage occurred. Within a particular warehouse, the object integrity sensing system can include a sensor engine that includes a camera and radar as components that support tracking a package, detecting a location of the object in package, and determining an optimal location for placing the transducer on the package.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 3 is a schematic associated with an object integrity sensing system for providing object integrity data using an acoustic signature management engine of the object integrity sensing system, in accordance with aspects of the technology described herein;

FIG. 5 provides a first exemplary method of providing object integrity data using an acoustic signature management engine in an object integrity sensing system, in accordance with aspects of the technology described herein;

FIG. 6 provides a second exemplary method of providing object integrity data using an acoustic signature management engine in an object integrity sensing system, in accordance with aspects of the technology described herein;

FIG. 7 provides a third exemplary method of providing object integrity data using an acoustic signature management engine in an object integrity sensing system, in accordance with aspects of the technology described herein;

DETAILED DESCRIPTION OF THE INVENTION

Overview of Technical Problems, Technical Solutions, and Technical Improvements

Object integrity sensing systems may support automating object integrity sensing in order to determine whether a product is impaired. Object integrity sensing systems can be based on acoustic imperfection sensing and acoustic imaging systems. In particular, object properties can be evaluated using RF signals or acoustic vibrometry. For example, an object integrity sensing system may use a RF to identify cracks on a product, when the product is unobstructed or un-occluded—in other words, when the product is not in a package. An object integrity sensing system can also use acoustic vibrometry (e.g., for broken railroads) to determine the integrity (e.g., extent of damage) of an object. For example, acoustic vibrometry can be performed using probes—that are physically attached to objects—to determine the integrity of the object.

Conventionally, object integrity sensing systems are not configured with computing logic for detecting object integrity when the product is packaged or enclosed in an intermediate medium (e.g., box). For example, RF signal systems do not have the ability to detect or measure product shears or sub-millimeter cracks, which are common forms of damage in fragile products. Acoustic vibrometry systems require time-consuming and carefully calibrated equipment—along with physical access to the object—to determine whether the object is impaired. Some systems—such as ultra sound systems—rely on special gels or liquids to conduct acoustic energy. Gels and liquids also require contact with the entity under investigation to draw conclusions based on the transmitted sound. As such, a more comprehensive object integrity sensing system—with an alternative basis for performing object integrity sensing operations—can improve computing operations and interfaces in an object integrity sensing system.

Embodiments of the present invention are directed to simple and efficient methods, systems, and computer storage media for, providing an indication of an integrity of an object—based on a non-invasive assessment of the integrity of the object—using acoustic signature management engine in object integrity sensing system. An indication of the integrity of an object (e.g., an impaired integrity of an object) can refer to a quantified amount of damage relative to the object in an undamaged state. The acoustic signature management engine supports a training phase and an execution phase that provide for: firstly, generating a reference acoustic signature corresponding to an object in an intermediate medium, and secondly, generating an acoustic signature of the object in the intermediate medium, respectively. The acoustic signature is compared to the reference acoustic signature such that an indication of an integrity of the object—based on the quantified difference between the reference acoustic signature and the acoustic signature—is communicated.

Figure 1:
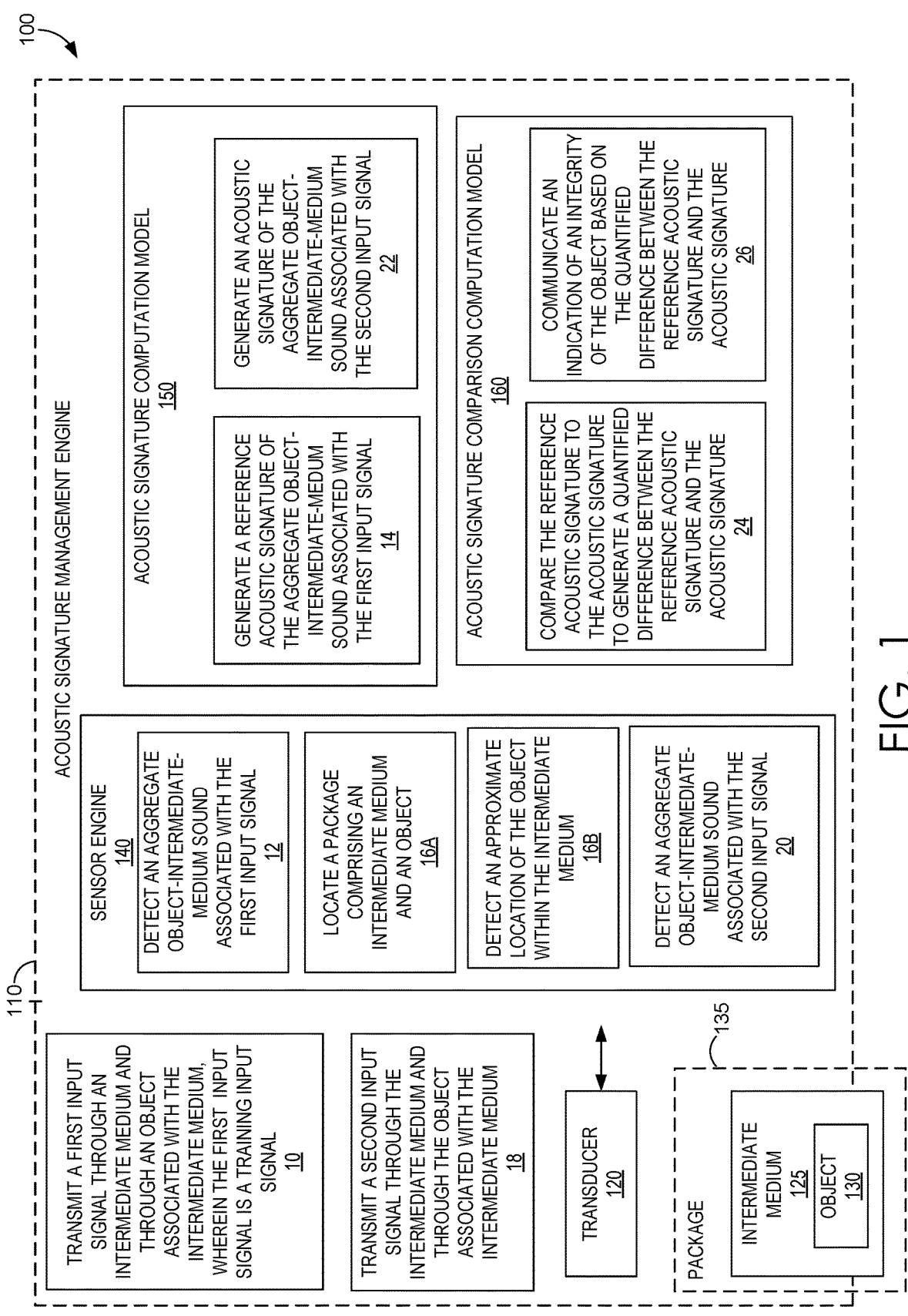
FIG. 1 is a block diagram of an exemplary object integrity sensing system for providing object integrity data using an acoustic signature management engine in the object integrity sensing system, in accordance with aspects of the technology described herein.

Aspects of the technical solution can be described by way of examples and with reference to FIG. 1. FIG. 1 illustrates an object integrity sensing system 100 having an acoustic signature management engine 110, a transducer 120, an intermediate medium 125 and an object 130 in package 135, a sensor engine 140, an acoustic signature computation model 150, and an acoustic signature comparison computation model 160.

At a high level, the object integrity sensing system supports a training phase—associated with generating reference acoustic signatures—and an execution phase—associated with determining aggregate object-intermediate-medium sounds and real-time (e.g., supply chain) acoustic signatures. The object integrity sensing system 100 operates based on a practical application of acoustic vibrometry for identifying object integrity, without requiring sophisticated equipment or physical probes. The integrity of a static object within an intermediate medium can be determined without having a pre-existing audio source in the object.

The object integrity sensing system includes the acoustic signature management engine 110 that supports generating acoustic signatures—including the reference acoustic signature—where an acoustic signature is a processed acoustic channel in a frequency domain that captures the mean and variance of an acoustic response (i.e., aggregate object-intermediate-medium sound) of the object in the intermediate medium. The execution phase can be used to generate an acoustic signature for the object in the intermediate medium (e.g., package)—while the package is in a supply chain. The acoustic signature is compared to the reference acoustic signature to support communicating an integrity of the object.

In operation, the acoustic signature management engine 110 can use a transducer (e.g., transducer 120) to conduct an audible chirp (i.e., input signal) into an object (e.g., object 130) enclosed in an intermediate medium (e.g., intermediate medium 125). Based on transmitting the audible chirp, an aggregate sound (e.g., an aggregate object-intermediate-medium sound) is picked up by a microphone (e.g., sensor 140).

The acoustic signature management engine 110 further includes a sensor engine includes a microphone, a camera, a radar device (e.g., mm-wave (collectively sensors 140) to help identify where the object is located within the intermediate medium and a microphone to detecting or capturing the aggregate object-intermediate-medium sound. The acoustic signature management engine 110 can be implemented based on sensory configurations to eliminate any need for transducer-dependent calibrations. The sensory configurations can be based on a number of different sensors (e.g., microphone, camera and radar). In this way, In particular, the sensor engine 140 supports an acoustic mm-wave based solution for through-box non-invasive object integrity sensing. Object integrity sensing can be sensitive to minute sub-mm cracks to in the object based on leveraging an acoustic resonance of objects via an intermediate medium to identify fine cracks or damage. The object integrity sensing system 100 perform non-invasive through-box acoustic sensing. An acoustic waveform can be determined to ensure sufficient acoustic energy transfer to the object.

The acoustic signature management engine 110 also operates based on acoustic signatures for damage detection. An acoustic signature is a computed magnitude frequency response associated with the package or object-intermediate-medium composite. The acoustic signature management engine 110 is associated with an acoustic signature computation model (e.g., acoustic signature computation model 150) for calculating the magnitude frequency response and an acoustic signature comparison computation model (e.g., acoustic signature comparison computation model 160 with a similarity metric and a clustering algorithm) that is used to detect anomalies between acoustic signatures—and in turn support providing indications of an integrity of an object in an intermediate medium. For example, a reference acoustic signature is compared to acoustic signature to generate a quantified difference between the acoustic signature of the aggregate object-intermediate-medium sound and the reference acoustic signature. The reference acoustic signature is associated with reference acoustic signature features 162 (e.g., mean, variance, frequency domain, and standard deviation) and the acoustic signature is associated with acoustic signature features 164 (e.g., mean, variance, frequency domain, and standard deviation) that are compared via the acoustic signature comparison model 160. An indication of an integrity of the object—based on the quantified difference between the reference acoustic signature and the acoustic signature—is communicated.

It is contemplated that the object integrity sensing system 100 can be bootstrapped when a misclassification of an object as having impaired integrity is determined. The aggregated data from the misclassified object can be used to update clustering for that object. Sample-efficiency and boot-strapping can be alternatives for obviating a training phase.

With continued reference to FIG. 1, the object integrity sensing system 100 can include the acoustic signature management engine 110 that supports providing an indication of an integrity of an object. The object is enclosed in an intermediate medium—such as a product in a box—referred to as a package (e.g., package 135 with intermediate medium 125 and object 130). The acoustic signature management engine 110 supports a training phase and an execution phase. The training phase supports generating a reference acoustic signature for the object and the intermediate medium. The execution phase supports generating an acoustic signature for the object associated with the intermediate medium (e.g., in a supply chain of a package corresponding to the object and the intermediate medium).

During the training phase, at block 10, the acoustic signature management engine 110 includes transducer 120 that transmits a first input signal through an intermediate medium and through an object associated with the intermediate medium. The first input signal is a training input signal. At block 12, a sensor engine 140 (e.g., a microphone) detects an aggregate object-intermediate-medium sound associated the first input signal. At block 14, an acoustic signature computation model 150 generates a reference acoustic signature of the aggregate object-intermediate-medium sound.

At block 16A, the sensor engine 140, locates a package (e.g., in a supply chain) comprising an intermediate medium and an object. At block 16B, the sensor engine 140 detects an approximate location of the object within the intermediate medium. At block 18, the acoustic signature engine 110 includes transducer 120 that transmits a second input signal through the package comprising the intermediate medium and the object. At block 20, the sensor engine 140 detects an aggregate object-intermediate-medium sound associated with the second input signal.

At block 22, an acoustic signature computation model 150 generates an acoustic signature of the aggregate object-intermediate-medium sound associated with the second input signal. At block 24, the acoustic signature comparison computation model 160 compares the reference acoustic signature to the acoustic signature to generate a quantified difference between the reference acoustic signature and the acoustic signature. At block 26, the acoustic signature comparison computation model 160 communicates an indication of an integrity of the object based on the quantified difference between the reference acoustic signature and acoustic signature.

Overview of Exemplary Environments for Providing Object Integrity Data

Figure 2A:
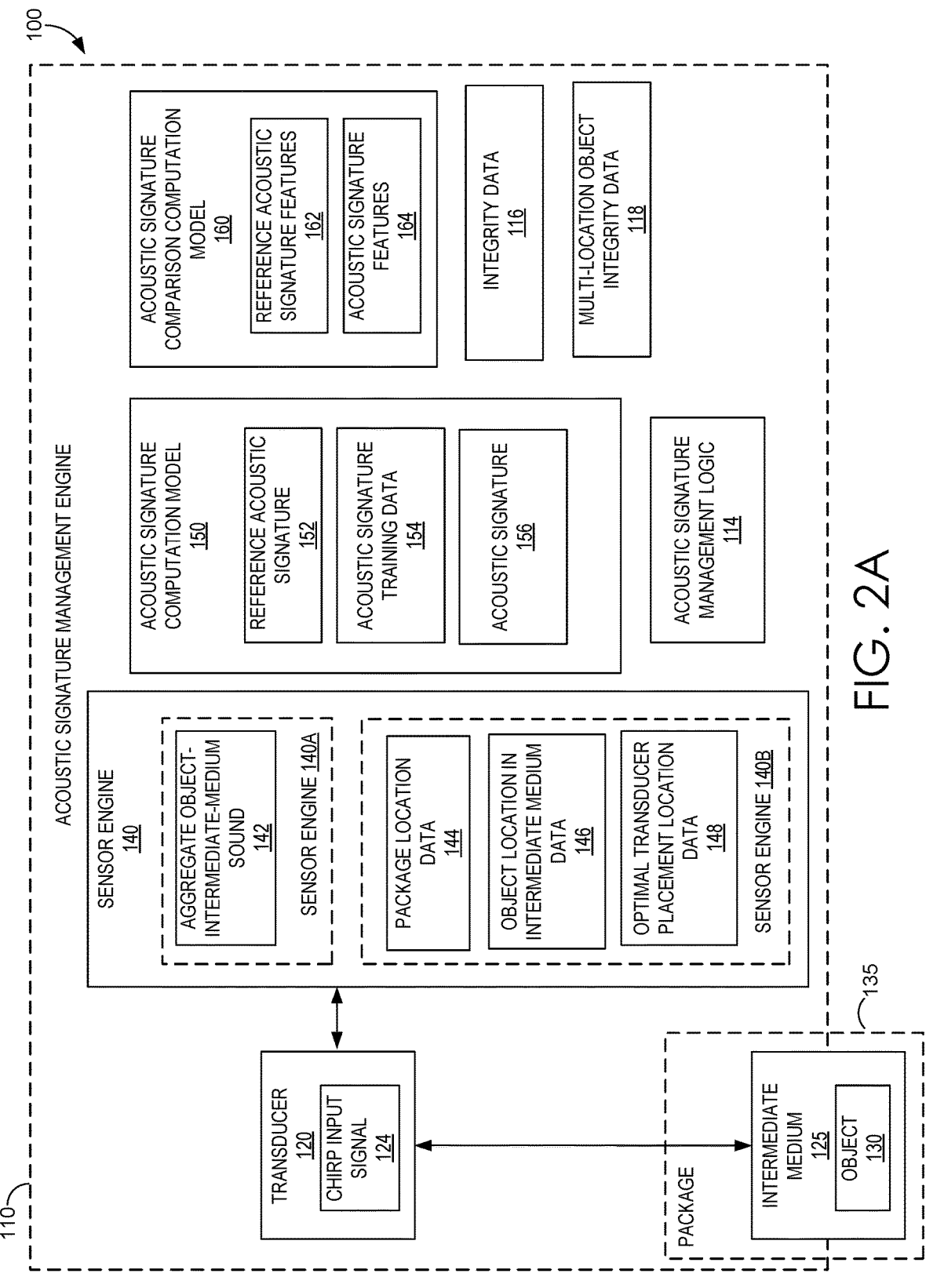
FIG. 2A-2D are exemplary illustrations of features of an object integrity sensing system for providing object integrity data using an acoustic signature management engine of the object integrity sensing system, in accordance with aspects of the technology described herein.

Aspects of the technical solution can be described by way of examples and with reference to FIGS. 2A, 2B, 3 and 4. FIG. 2A is a block diagram of an exemplary technical solution environment, based on example environments described with reference to FIGS. 8 and 9 for use in implementing embodiments of the technical solution are shown. Generally the technical solution environment includes a technical solution system suitable for providing the example object integrity sensing system 100 in which methods of the present disclosure may be employed. In particular, FIG. 2A shows a high level architecture of the object integrity sensing system 200—that corresponds to the object integrity sensing system 100—in accordance with implementations of the present disclosure.

Among other engines, managers, generators, selectors, or components not shown (collectively referred to herein as "components"), the technical solution environment of object integrity sensing system 110 includes signature management engine 110, a transducer 120, input signal 124, an intermediate medium 125, an object 130, a sensor engine 140 including sensor engine 140A with aggregate object-intermediate-medium sound and sensor engine 140B with package location data 144, object location intermediate medium data 146, optimal transducer location data 148, an acoustic signature computation model 150—including reference acoustic signature 152, and acoustic signature training data 154—and an acoustic signature comparison computational model 160—including reference acoustic signature features 163 and acoustic signature features 164, springs 170, admin client 180, acoustic signature management logic 114, integrity data 116, and multi-location object integrity data 118.

The acoustic signature management engine 110 is responsible for providing an indication of an integrity of an object based on a non-invasive assessment of the integrity of the object. The acoustic signature management engine 110 supports detecting whether an object (e.g., a fragile product made of porcelain or glass) is damaged without opening its packaging. In particular, the object can be a fragile material having a low noise reduction coefficient measurement. A noise reduction coefficient is an average rating of how much sound an acoustic product can absorb. Like a sponge absorbs water, an acoustic product absorbs sound and the NRC indicates how much sound those products can soak up. As such, an acoustic signature is provided as a function of the noise reduction coefficient of the object.

The acoustic signature management engine 110 induces a mechanical wave propagation—via an input signal—through the object within the intermediate medium and receives an acoustic response. Sensors (e.g., mm-wave radar and camera) of the acoustic signature management engine 110 provide additional imaging information to maximize transfer of energy from outside the intermediate medium to the object for enhanced internal resonance of the object. Mechanical vibrations (e.g., audio chirp or mechanical impulse) from the transducer 120 are generated to reach the object.

Figure 2B:
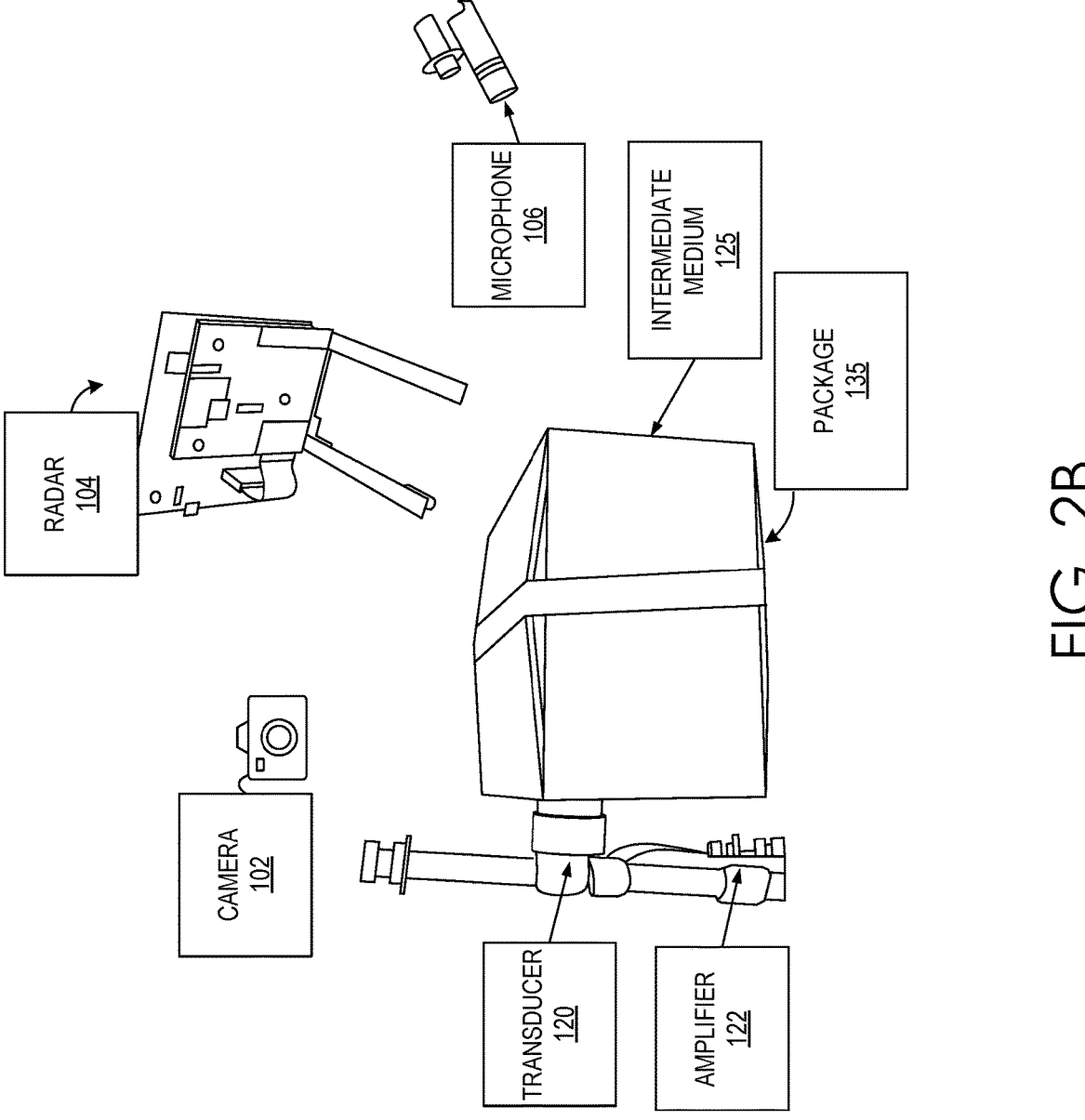

With reference to FIG. 2B, the transducer 120 can be a contact transducer that operates with amplifier 122 that supports feeding the acoustic signal via the transducer 120 attached to the side of package 135. In one embodiment, the transducer 120 is positioned such that have the object's weight cannot be transferred. For example, the transducer 120 can be attached horizontally in order to limit strong feedback breaking the feed-forward model. The transducer 120 may further includes a flat plate (e.g., metal plate 122 of FIG. 2D) that attaches and drives the object. For example, the flat plate 122 can be small in comparison to the size of the box in contrast to a large plate that acts as a strong acoustic radiator, and portions with line of sight to the microphone 140 introduce a significant additive. FIG. 2B further illustrates sensor engine components: camera 106, radar 108, and microphone 109 configured to perform functionality discussed in more detail herein.

The acoustic signature management engine 110 operates without contacting the object 125 in the intermediate medium 130. As such, the acoustic signature management engine 110 supports the transducer-object-intermediate-medium composite as an efficient radiator, acting as an ad-hoc speaker. The transducer-object-intermediate-medium composite is placed next to microphone 140 to obtain a usable signal-to-noise ratio (SNR). As discussed in more detail below, it is possible to tease apart usable breakage information from a composite signal (e.g., aggregate object-intermediate-medium sound) associated the transducer-object-intermediate-medium composite. However, the specific sensing configurations including physical setup sensor components (i.e., sensor engine 140A and sensor engine 140B) in the acoustic signature management engine 110 are provided to support the functionality described herein.

Figures 2C, 2D:
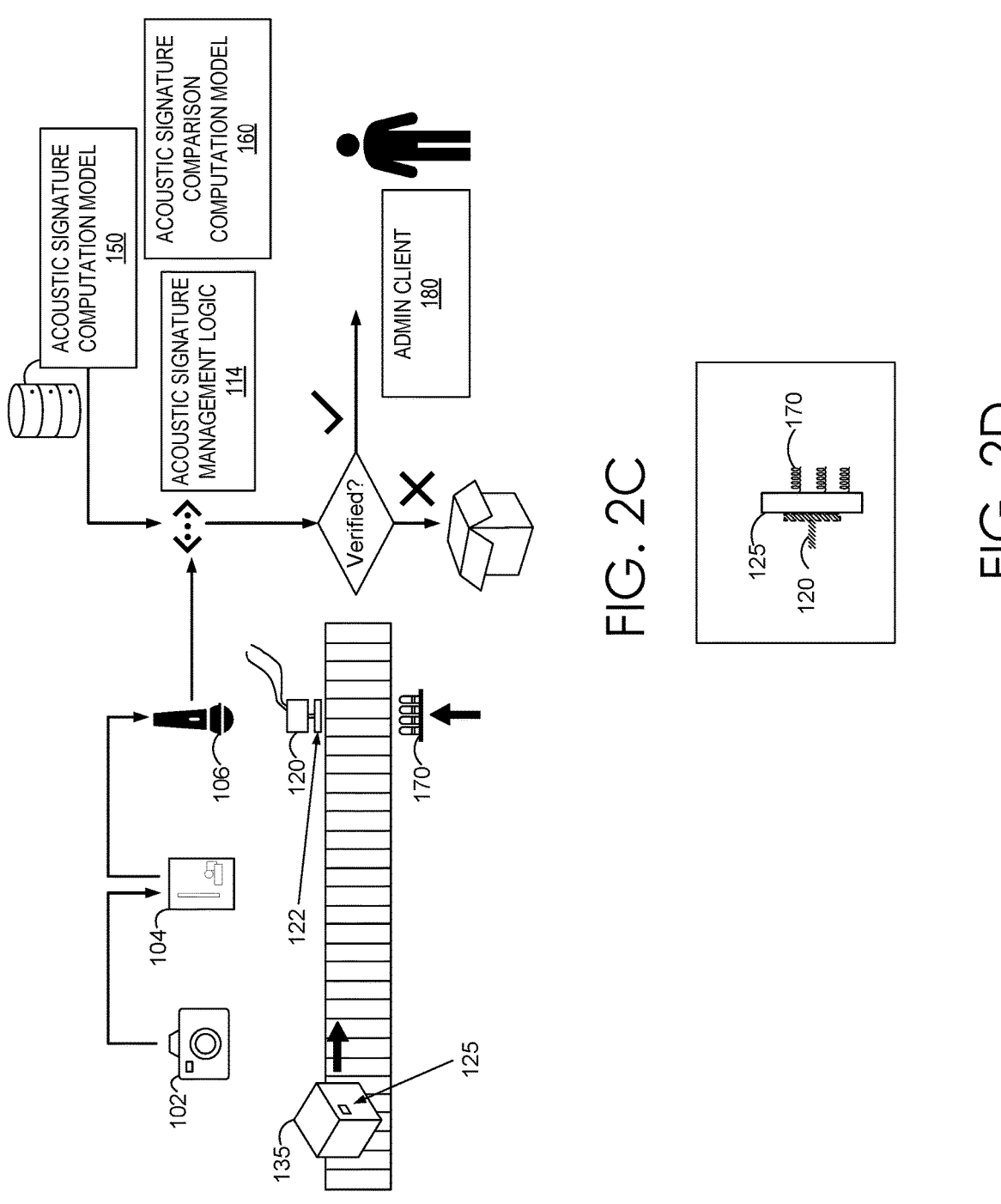

With reference to FIGS. 2A and 2C, the acoustic signature management engine 110 can utilize a sensing configuration to determine location data that supports performing the functionality described herein. The location data can include package location data 144, object location in intermediate medium data 146, optimal transducer placement location data 148. A sensing configuration can be based on tracking sensors (e.g., camera 102 and radar 104) of a sensor engine and their corresponding locations for tracking packages. The tracking sensors can be used to identify where the package is located (e.g., on a conveyor belt) and to identify a location of the object in the intermediate medium.

A first tracking sensor can be a camera that supports camera-based package positioning. The camera 102 can operate with object recognition and image segmentation algorithms that identify the spatial coordinates and bounds of the package (e.g., along a conveyor belt). The camera 102 can be placed ahead of a second tracking sensor (i.e., radar 104) that scans the contents of the package. A second tracking sensor can be a radar-based package position. The radar can be a millimeter wave radar—mm-wave radar. The radar 104 can collect I/Q samples relative to the package movement to compute an RF through-box image.

With the radar, Bartlett algorithm-based processing can be used across an antenna on the radar 104 that results in a hotspot that match the spatial bounds of the object within the intermediate medium. An optimal location to place the transducer can be computed by matching the mm-wave RF image with a template RF image that is centered at the optimal transducer location. The optimal location to attach the transducer can also be manually inferred. The optimal location could be a location identified based understanding the manufacture's packing methodology. For example, a quantified amount of movement of the object from a known original position of the object can be determined in order to determine a current position of the object in the intermediate medium. With the location of the object identified, an amount of energy transfer from the transducer 120 can be maximized. In this way, the optimal location can be defined as a calculated location for maximizing transfer of energy from the transducer to the intermediate medium and the object.

The transducer 120 can be placed proximate to the intermediate medium in any number of ways. In one example, the transducer 120 is placed to keep the object in place, while the object remains elastic enough to enable vibration of the box to the maximum possible amplitude. In particular, helical springs (e.g., helical springs 170 of FIG. 2D) can be used to push the object back against the transducer. An automated arm can be used to attach springs that push the intermediate medium against the transducer to achieve the same behavior.

The acoustic signature management engine 110 implements an acoustic model. The acoustic model can be implemented via the acoustic signature computation model 150 that implements a feed-forward chain of linear filters as follows:

$$p(t) = s(t) * s_{eq}(t) * h(t) * r(t) * r_{eq}(t)$$

where p(t) is the signal received at the microphone, s is a broadband signal input (e.g., wide-band input excitation signal) to the transducer, seq is the unknown transducer response, h is the response of interest, $\tau$ the through-the-air response from object (and intermediate medium) up to the microphone and finally, req is the microphone's unknown response. With this equation, the acoustic model can further be employed to estimate h despite multiple unknowns by doing a reference measurement without the intermediate medium:

$$P_{ref}(t) = s(t) * s_{eq}(t) * r(t) * r_{eq}(t)$$

followed by a deconvolution in frequency domain (where the acoustic logic uses capitals to denote Fourier-transformed quantities):

$$H(f) = P(f)/P_{ref}(f)$$

In this way, the object integrity sensing system 100 is self-calibrating: (1) $P_{ref}$ can be periodically updated when no boxes are present on a conveyor belt, and (2) commodity transducers—that may deviate from a flat frequency response (i.e. $S_{eq}(f) \neq 1$, $R_{eq}(f) \neq 1$)—can still be employed since these are de-convolved away. One could employ Weiner deconvolution with ambient noise estimates in the absence of an input signal for increased robustness; although direct deconvolution sufficed.

With reference to FIG. 2D, the object integrity sensing system 100 can implement springs (e.g., helical springs 170) to hold the intermediate medium (e.g., box) in place while the transducer 120 is attached to the intermediate medium side. As discussed herein, an optimal location for attaching the transducer 120 can be identified—using a various techniques—in order to maximize the energy transfer. In one embodiment, multiple helical springs 170 are employed to push the object back against the transducer. In another embodiment, an automated arm can be used to attach springs that push the intermediate medium against the transducer to achieve the same behavior. The amount of energy transferred from the intermediate medium to the spring setup is minuscule—and can be distributed across multiple springs. For example, springs of this nature have shown even in cases where these resonance frequencies exist, they are outside the acoustic frequencies that we operate in (>100 Hz and <20 kHz).

The acoustic signature management engine 110 can be used for damage detection—in other words—providing an indication of an integrity of an object based on a non-invasive assessment of the integrity of the object. A training phase can be used to determine an initial object signature (i.e., a reference acoustic signature). The reference acoustic signature can be generated based on capturing a plurality of receptions of signals from a transducer associated with a package. A signal can be an input signal (e.g., a wide-band input signal or audible chirp) can be used to generate a reference acoustic signature. A wide-band input signal sweeps acoustic frequencies between 100 Hz and 20 kHz over a time duration of 5s. A wide-band input signal is advantageous because it naturally spans the range of frequencies desired to allow for rich signatures for package-sized object; it circumvents the band-limited nature of the transducer since it since the instantaneous bandwidth of a wide-band input signal is extremely low.

The acoustic signature is a processed acoustic channel in the frequency-domain that captures the mean and variance of the acoustic response signatures of the composite box-object system. A subset of frequencies are stored. For example, frequency measurements that are robust and repeatable across measurements or frequency measurements that are likely to fall within the frequency response of the object's material are stored. It is contemplated that the response of the package (i.e., intermediate medium-plus-object composite) can be stored rather than isolating the object. Advantageously, the response of the package can be less challenging than isolating the object's sole response can be more given that the acoustic wave propagates in complex ways across both the box and the object. Moreover, any change in the object will feature in the response of the box-plus-product system—which is our objective in any case.

Mathematically, a computing logic (e.g., acoustic signature management logic 114) of the acoustic signature computation model 150 is configured to compute the acoustic signature as follows: (1) First, $H(f)=P(f)/P_{ref}(f)$ is used to compute the acoustic response in the frequency domain, $H_i(f)$, where $i=1, \ldots, n$ for each of n receptions collected from n input signal (e.g., chirps); (2) Second, the computing logic computes the mean and standard deviation $\mu(f)$ and $\sigma(f)$ of each measurement; (3) Finally, the computing logic can drop any measurements in the $(\mu(f), \sigma(f))$ tuple over 20 kHz or below 100 Hz to filter out frequencies that are either too large or too small to have the acoustic response featured. In one embodiment, the computing logic can further filter this bandwidth further, based on any prior information of the frequency response for an object.

The acoustic signature can be generated to be resistance to noise based on performing additional pre-processing steps. The acoustic signature management engine 110 operates based on two sources of error: (1) Ambient noise or narrowband interferers that perturb specific measurements of the frequency response; (2) Frequencies that are inherently poor in data owing to high variance across signature measurements, often due to transducer imperfections; Mathematically, computing logic of the acoustic signature management engine 110 is supports performing the following two steps:

First, the computing logic measures an additional metric $c(f)$—called the confidence-metric, that is a normalized signal-to-interference-plus-noise ratio (SINR) across measurements at a given frequency. (2) Second, computing logic performs outlier rejection to remove frequencies where $\sigma(f)$ $\mu(f)$ exceeds a threshold to drop measurements in extremely noisy frequencies. At the end of this process, the values $(\mu(f), \sigma(f), c(f))$ measured across a set of frequencies $f \in F$ (that excludes outliers, etc. as described above) represent the acoustic signature of the product. Note that in principle, the acoustic signature of an object could also be computed from a single channel measurement as opposed to a set of n receptions. In this case, however, the signature would simply be $(\mu(f), c(f))$ as the standard deviation would not be defined Turning to the acoustic signature comparison model 160, having computed a reference acoustic signature and acoustic signature of an instance of a package, the object integrity sensing system 100 further includes computing logic or mechanism (e.g., acoustic signature comparison computation model) to compare two signatures of the same object—one the initial signature s $I=(\mu I (f), \sigma I(f), cI (f))$ computed during manufacture and another a $s=(\mu(f), c(f))$ collected at a later time (e.g., a warehouse). In one embodiment, the latter signature lacks the standard deviation $\sigma(f)$, since the computing logic can be configured to take only one measurement at a time in each warehouse facility per product. The computing logic or mechanism to accurately compare how dissimilar two signatures are relative to each other is a distance metric.

By way of example, comparing two signatures can include computing the L-2 norm of the difference in their $\mu$ 11                                                      12 values. The computing logic weights each difference in μ values by two factors: (1) $1/\sigma \, I \, (f)$ to account for noise and interference in the initial object signatures per frequency; (2) $c(f)$ and $c \, I \, (f)$, the respective confidence values in the initial and newly observed product signatures. Mathematically, the distance is:

$$d(s^I, s) = \left\| c(f)c^I(f)\frac{\mu(f) - \mu^I(f)}{\sigma^I(f)} \right\|_2$$

With reference to FIG. 3, FIG. 3 is an schematic 300 associated with computing a threshold for a distance signature observed on the field (e.g., supply chain) with the reference signature used to assess damage. FIG. 3 includes the reference signature 310, individual signatures 320, 324, 326, and 328. The threshold can be based on individual initial measurements used to generating the reference signature. A threshold can be employed where the threshold is based on the distance calculated above. The threshold supports making a decision on whether this distance is sufficiently large to declare the object damaged or otherwise. In other words, an optimal threshold on the distance can be defined in order to accurately identify if an object is damaged.

To compute this threshold, the computing logic relies on the individual channel measurements $H_i$ (f) collected shortly after the manufacture. Recall that each of these acoustic channel measurements were used collectively to form the initial object signature $s^I=(\mu(f), \sigma(f), c(f))$. However, the acoustic signature management engine 110 can also process these channels one at a time to form individual signatures $s_i=(\mu i(f), ci(f))$. In the schematic 300 as a vector space, these individual signatures $s_i$ are illustrated in relation to the reference object signature $s_i$. The individual signatures $s_i$ are spatially separated and spread out relative to $s^I$ within some circle (i.e., circle 340 with radius 330) while staying intact within another circle (e.g., circle 360 with radius 350). This circle 340 has a radius defined by the maximum distance across each individual signature $s_i$ relative to the reference signature $s^I$, that is:

$$d_{max} = \max_i \, d(s^I, s_i)$$

In other words, the maximum distance circle shown in FIG. 3 provides a sense of how much signatures can deviate across many measurements for one undamaged product.

By way of illustration, for signature s for an object at a warehouse. An object is determined to be damaged if $d \, (s \, I, \, s) > \tau d_{max}$ and not damaged otherwise, where $\tau$ is a threshold parameter. As shown in FIG. 3, it is contemplated that the acoustic signature of an object will fall within an error circle that has a radius slightly larger than $d_{max}$ by a factor of $\tau$, to offer some error tolerance in our initial data from the factory. The value $\tau$ is a parameter that decides how tightly around the $d_{max}$ circle all non-damaged objects will be. The choice of the correct value of the threshold parameter $\tau$ can directly impacts our false positives vs. false negatives and overall cost savings. The value of $\tau$ is scaled inversely based on the number of data points n collected at the factory.

With reference to sample augmentation, it is contemplated that the acoustic signature management engine 110 can actively learn from undamaged boxes that were opened. However, by opening a box, we the acoustic signature management engine 110 can receive the information that the box is undamaged now, but also for all previous stages in the supply chain (including in previous warehouses, hubs, etc.). This is valuable information because it immediately indicates to the acoustic signature management engine 110 that the signature of this product as well as all previously recorded signatures of this product correspond to that of an undamaged product. This improves the number of samples available for the acoustic signature management engine 110 for reducing the effective validation cost of our system.

With reference to bootstrapping, the acoustic signature management engine 110 uses the above observation to include all these signatures into the set of initial individual signatures as shown in FIG. 3. It can then repeat the process comparing acoustic signatures to update $d_{max}$, if needed, based on the distance of these newly added signatures as well as reduce $\tau$ to account for the number of newly added signatures. The net effect would be an expansion of the circle in FIG. 3 to accommodate these previously outlying measurements. We could even start with a new object with no measurements, and the acoustic signature management engine 110 would trigger the box to be opened and update its estimates throughout the supply chain.

Turning to tuning the threshold, a user of the object integrity sensing system 100 may choose a threshold multiplier, $\tau$, to optimize for the net cost savings. Around such an optimum, as the value of $\tau$ is lowered, the number of false negatives increase and customers get more damaged items. On the other hand, if the value of $\tau$ is too high, the number of false positives increases, thus incurring more validation cost unnecessarily, but less damaged items get shipped to customers. Therefore, for each threshold $\tau$, can be based on empirical evaluation of the anticipated false positives and false negatives. As such, a threshold can be tuned so that net-on-net, the cost reductions are maximized with our system compared to the prevalent system. Tuning in this way can identify a threshold referred to as a profit optimum. The profit-optimum is dependent on both validation and return cost and may not always be the same as, say than the canonical accuracy optimum where the false positive and false negative rates are weighed equally.

As such, operationally, the acoustic signature comparison computation model 160 compares the reference acoustic signature to the acoustic signature to generate a quantified difference between the reference acoustic signature and the acoustic signature. The acoustic signature comparison computation model 160 communicates an indication of an integrity of the object based on the quantified difference between the reference acoustic signature and the acoustic signature. For example indication can be communicated to an admin client (e.g., admin client 180). The indication can specifically include whether the object is impaired based on the threshold.

Figure 4:
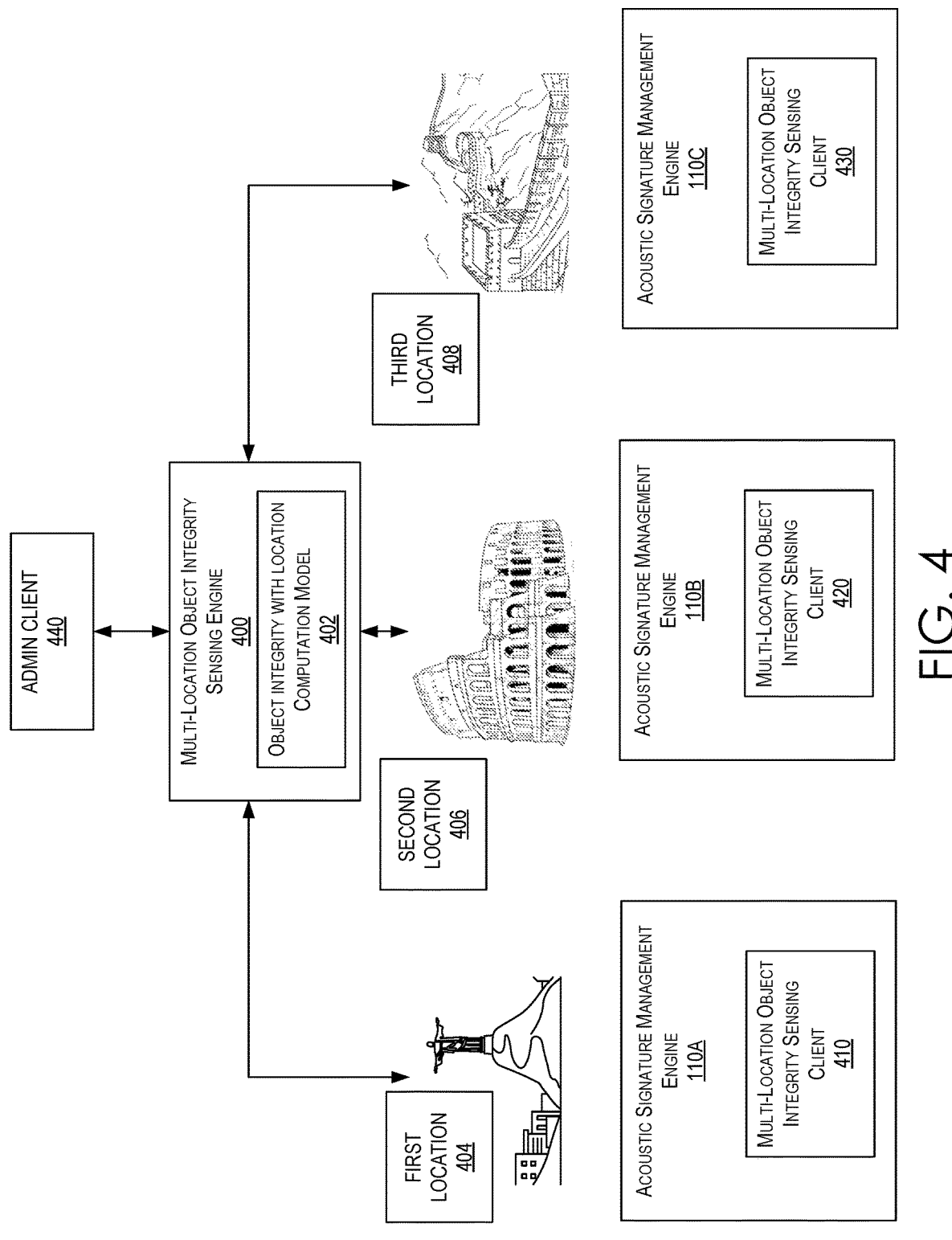
FIG. 4 is a block diagram of an exemplary object integrity sensing system with a multi-location object integrity sensing engine for providing object integrity data using an acoustic signature management engine of the object integrity sensing system, in accordance with aspects of the technology described herein.

With reference to FIG. 4, FIG. 4 illustrates a multi-location object integrity engine 400 including object integrity with location computation model 402, first location 404, second location 406, third location 408, and multi-location object integrity sensing clients 410, 420, and 430 in corresponding acoustic signature management engines 110A, 110B, 110C. At a high level, the multi-location object integrity engine 400—via the object integrity with location computation model 402—calculates a quantified difference between a reference acoustic signature and a first acoustic signature associated with a first location and a then calculates a quantified difference between the reference acoustic signature and the second acoustic signature associated with a second location 406. In this way, based on the quantified difference between the reference acoustic signature and the first acoustic signature and the quantified difference between the reference acoustic signature and the second acoustic signature, communicate a first indication of an integrity of the object at the first location or a second indication of an integrity of the object at the second location 406. The first indication of the integrity of the object can be communicated with an identifier of the first location and the second indication of the integrity of the object can be communicated with an identifier of the second location 406.

By way of example, a package may arrive at a warehouse of a first location (e.g., first location 404) or processing hub for either delivery on its way to another warehouse of a another location (e.g., second location or third location). The object integrity (e.g., object integrity with location data) can be tracked across multiple locations such that damage to an object can be attributed to the appropriate location. The object sensing integrity system (e.g., object sensing system 100) can be associated with cameras in the different location based on corresponding acoustic signature manage engines.

At each location, the corresponding acoustic signature management engine includes a transducer (e.g., a contact transducer) and a sound sensor (e.g., a microphone). The contact traducer conducts an audible chirp into the object via some intermediate medium (also referred to herein as box). The intermediate medium may refer to any box in which the object is enclosed. The intermediate medium operates as a sound source or acoustic speaker based on the audible chirp. An optimal location of the transducer can also be determined for an object. The object may be moving along a conveyor belt. Alternatively, the object may be evaluated using an autonomous robot or robotic arm to processes the package (i.e., object and intermediate medium composite).

It is contemplated that the external transducer and microphone can be configured to not have direct physical contact with the object with an intermediate medium (e.g., packaging or box). The object integrity sensing system 100 processes measurements from the microphone to generate a reference acoustic signature for the object and intermediate medium. The reference acoustic signature is an environment-independent product signature that can be used to sense object impairments. Upon detecting the location of the object inside of the box, an acoustic transducer is placed against the box. The acoustic transducer can be placed against the box at a point that is closest relative to the object. A microphone captures the acoustic response and computes an acoustic signature, which is compared to a prior acoustic signature (i.e., a reference acoustic signature) of the same object when it was undamaged. As shown in FIG. 2C, if the signature check fails, the box is sent to for inspection, otherwise, if it is passed to the next stage of the supply chain. The check can be done as part of an ingress or egress process to help identify where the product damage took place.

At each location, as previously discussed herein, a sensor engine (e.g., microphone, camera, radar) of the acoustic signature management engine can support tracking packages (i.e., object in an intermediate medium). For example, cameras may identify a particular package (e.g., via a barcode) at the different locations. The cameras can be used to determine an orientation of the intermediate medium (e.g., box) enclosing the object. This camera can help in obtaining a baseline location of the intermediate medium itself as intermediate medium is relatively transparent to mm-wave frequencies. In some embodiments, a static mm-wave scan can be performed to detect whether and how much the object is displaced inside the intermediate medium. An automated approach obviates having to manually open and inspect a large number of packages at various checkpoints. A non-automated approach can be cumbersome and costly and in fact add to the risk of damage. Corresponding multi-location object integrity sensing clients can support communicating the object integrity data and location data such that the multi-location object integrity sensing communicates The object integrity sensing system 100 utilize the radar (e.g., mm-wave radar) and a camera to rapidly identify where the object is located within the box. For example, the location of the object within the box can be determined as the box moves along a conveyor belt to inform the acoustic transduce when it is to be activated. The optimal location can be found using a camera-plus-mm-wave radar setup that both senses the location of the box and the placement of the object inside it. The mm-wave radar supports identifying the location of the object. The radar can distinguish signatures across compartments in a reasonably sized box. For example, the radar can achieve accuracy of 4.7 cm in identifying the location of the cup inside the box. It is contemplated that the bounding box across dimensions can be known, which can further help more accurately identify the location of an object inside of an intermediate medium. The acoustic response at the microphone is evaluated as a function of frequency to characterize the object of interest.

The object integrity sensing system 100 provides the ability to effectively measure acoustic behavior of objects, and in turn, their integrity. The object integrity sensing system assesses an integrity (i.e., extent of damage) of the object. The aggregate sound (e.g., aggregate object-intermediate-medium sound) from the composite object and intermediate medium is picked up by a microphone. An input signal (e.g., an audible chirp) traverses and reverberates across an object, resulting in a resonant frequency-dependent response that is unique to the shape, topology, and materials of the object. For example, boxes being transmitted on a conveyor belt in a warehouse are sensed—via the object integrity system—using a self-calibrating setup.

Detecting damage to the object within the intermediate medium is based on an acoustic signature. The acoustic signature is a magnitude frequency response that is a calculated for the object and intermediate medium composite. An acoustic signature for an object and intermediate medium can be measured at an point in the supply chain using operations described herein. The acoustic signatures can be generated to be robust to ambient noise. For example, a similarity metric for the acoustic signatures can be used to compare acoustic signatures. The metric can be associated with a straightforward clustering algorithm that yields a sample-efficient anomaly detector. A reference acoustic signature that is compared to an acoustic signature of an instance of an object and intermediate medium can be generated via a training phase. For example, a plurality of instances of the object or the object and intermediate medium to achieve a high accuracy of identifying anomalies. The training phase can help identify as-yet-unseen defects, such as cracking, shear, or breaking with false positives and negative.

In one embodiment, the multi-location object integrity sensing client of each location (i.e., 410, 420, and 430) communicate acoustic a first acoustic signature associated with a package comprising an object in an intermediate medium, a second acoustic signature associated with the package, and a third acoustic signature associated with the package. The first acoustic signature, second acoustic signature, and third acoustic signature are received at the multi-location object integrity sensing engine 400. The multi-location object integrity sensing engine 400 via the object integrity with location computation model 402—operate to access a reference acoustic signature corresponding to the object and the intermediate medium and compare the reference acoustic signature to the first acoustic signature, the second acoustic signature, and the third acoustic signature to generate a quantified difference between the reference acoustic signature and the first acoustic signature, the second acoustic signature, and the third acoustic signature.

Based on the quantified difference between the reference acoustic signature and the first acoustic signature, the second acoustic signature, the multi-location object integrity sensing engine can communicate a first indication of an integrity of the object at the first location, or a second indication of an integrity of the object at the second location, or a third indication of an integrity of the object at the third location. The indications can be communicated to an administrator (e.g., admin client 440) via a graphical user interface for additional processing. Other variations and combinations of clients for receiving the indications are contemplated with embodiments of the present disclosure.

Exemplary Methods for Providing Object Integrity Data

With reference to FIGS. 3, 4 and 5, flow diagrams are provided illustrating methods for providing missing meeting content manifests in an object integrity sensing system. The methods may be performed using the object integrity sensing system described herein. In embodiments, one or more computer-storage media having computer-executable or computer-useable instructions embodied thereon that, when executed, by one or more processors can cause the one or more processors to perform the methods (e.g., computer-implemented method) in the object integrity sensing system (e.g., a computerized system or computing system).

Turning to FIG. 5, a flow diagram is provided that illustrates a method 500 for providing an indication of an integrity of an object. A block 502, the method includes transmitting an input signal through an intermediate medium and through an object associated with the intermediate medium. At block 504, the method further includes, in response to transmitting the input signal, detecting, via a sensor (e.g., a microphone) an aggregate object-intermediate-medium sound. At block 506, the method also includes generating an acoustic signature corresponding to the aggregate object-intermediate sound. At block 508, the method includes accessing a reference acoustic signature corresponding to the object and the intermediate medium. At block 510, the method also includes comparing the reference acoustic signature to the acoustic signature to generate a quantified difference between the reference acoustic signature and the acoustic signature. At block 512, the method includes communicating an indication of an integrity of the object based on the quantified difference between the reference acoustic signature and the acoustic signature.

Turning to FIG. 6, a flow diagram is provided that illustrates a method 600 for providing an indication of an integrity of an object. At block 602, the method includes receiving, via a first multi-location object integrity sensing client, a first acoustic signature associated with a package comprising an object in an intermediate medium. At block 604, the method further includes receiving, via a second multi-location object integrity sensing client, a second acoustic signature associated with package. At block 606, the method also includes accessing a reference acoustic signature corresponding to the object and the intermediate medium. At block 608, the method includes comparing the referencing acoustic signature to the first acoustic signature and the second acoustic signature to generate a quantified difference between the reference acoustic signature and the first acoustic signature and a quantified difference between the reference acoustic signature and the second acoustic signature. At block 610, the method further includes, based on a quantified difference between the reference acoustic signature and the first acoustic signature and a quantified difference between the reference acoustic signature and the second acoustic signature, communicate a first indication of an integrity of the object at the first location.

Turning to FIG. 7, a flow diagram is provided that illustrates a method 700 for providing an indication of an integrity of an object. At block 702, the method includes accessing a reference acoustic signature for an object associated with an intermediate medium. At block 704, the method further includes accessing a reference acoustic signature corresponding to the object and the intermediate medium. At block 706, the method also includes comparing the reference acoustic signature to the acoustic signature to generate a quantified difference between the reference acoustic signature and the acoustic signature. At block 708, the method includes communicating an indication of an integrity of the object based on the quantified difference between the reference acoustic signature and the acoustic signature.

Embodiments of the present invention have been described with reference to several inventive features (e.g., operations, systems, engines, and components) associated with an object integrity sensing system having an acoustic signature management engine for providing an indication of an integrity of an object. Inventive features described include: operations, interfaces, data structures, and arrangements of computing resources associated with providing the functionality described herein relative with reference to acoustic signature management engine and user interfaces providing user interaction models.

Functionality of the embodiments of the present invention have further been described, by way of an implementation and anecdotal examples to demonstrate that the operations—for providing an indication of an integrity of an object based on a non-invasive assessment of the integrity of the object using acoustic signature management engine in object integrity sensing system—are an unconventional ordered combination of operations that operate with an acoustic signature management engine as a solution to a specific problem in object integrity sensing technology environment. The unconventional order combination of operations provide improved computing operations and interfaces for user interface navigation in object integrity sensing systems. Overall, these improvements result in less CPU computation, smaller memory requirements, and increased flexibility in object integrity sensing systems when compared to previous conventional object integrity sensing system operations performed for similar functionality.

Additional Support for Detailed Description

Example Distributed Computing System Environment

Figure 8:
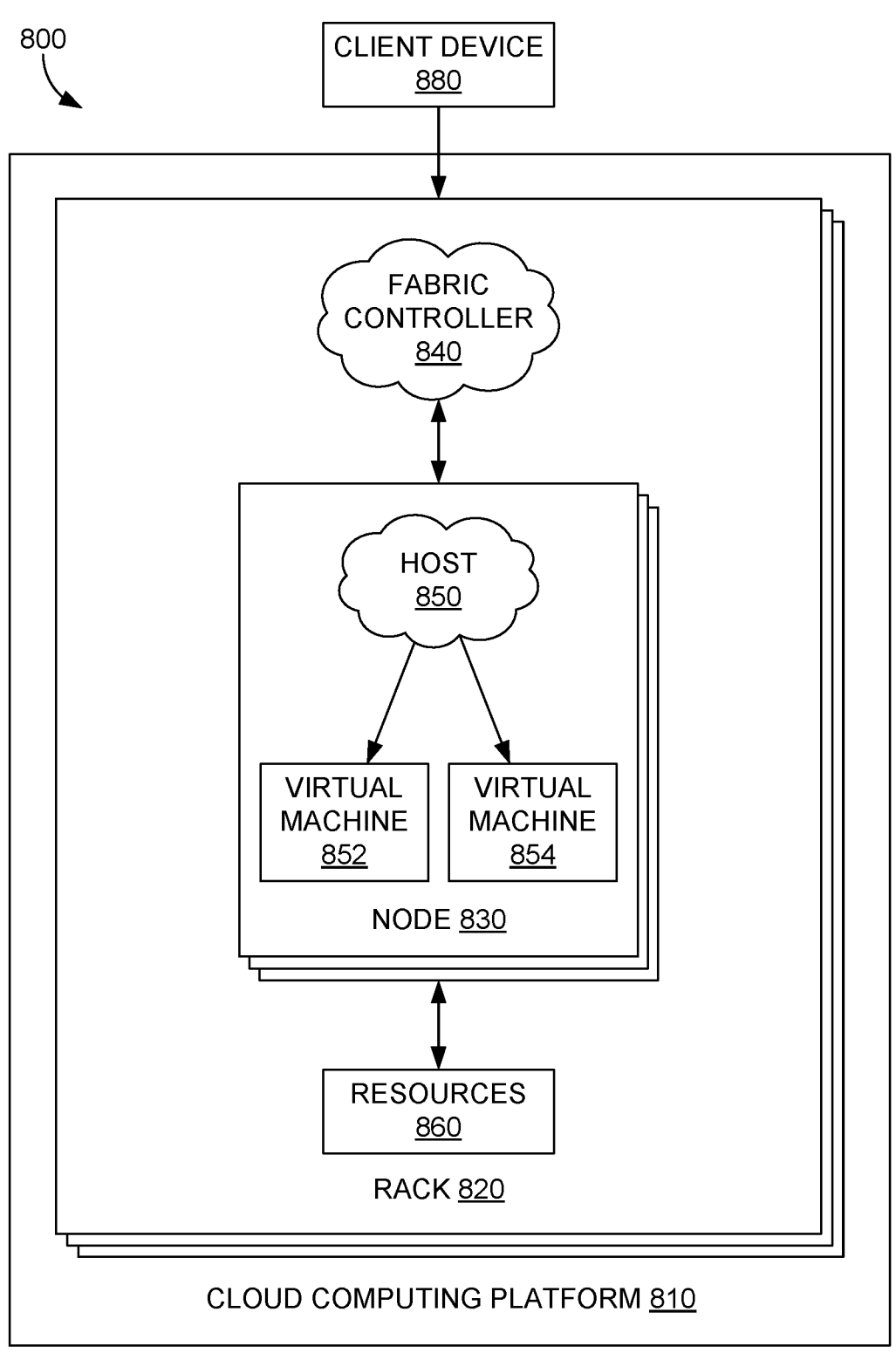
FIG. 8 provides a block diagram of an exemplary distributed computing environment suitable for use in implementing aspects of the technology described herein.

Referring now to FIG. 8, FIG. 8 illustrates an example distributed computing environment 800 in which implementations of the present disclosure may be employed. In particular, FIG. 8 shows a high level architecture of an example cloud computing platform 810 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 800 that includes cloud computing platform 810, rack 820, and node 830 (e.g., computing devices, processing units, or blades) in rack 820. The technical solution environment can be implemented with cloud computing platform 810 that runs cloud services across different data centers and geographic regions. Cloud computing platform 810 can implement fabric controller 840 component for provisioning and managing resource allocation, deployment, upgrade, and management of cloud services. Typically, cloud computing platform 810 acts to store data or run service applications in a distributed manner. Cloud computing platform 810 in a data center can be configured to host and support operation of endpoints of a particular service application. Cloud computing platform 810 may be a public cloud, a private cloud, or a dedicated cloud.

Node 830 can be provisioned with host 850 (e.g., operating system or runtime environment) running a defined software stack on node 830. Node 830 can also be configured to perform specialized functionality (e.g., compute nodes or storage nodes) within cloud computing platform 810. Node 830 is allocated to run one or more portions of a service application of a tenant. A tenant can refer to a customer utilizing resources of cloud computing platform 810. Service application components of cloud computing platform 810 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 830, nodes 830 may be partitioned into virtual machines (e.g., virtual machine 852 and virtual machine 854). Physical machines can also concurrently run separate service applications. The virtual machines or physical machines can be configured as individualized computing environments that are supported by resources 860 (e.g., hardware resources and software resources) in cloud computing platform 810. It is contemplated that resources can be configured for specific service applications. Further, each service application may be divided into functional portions such that each functional portion is able to run on a separate virtual machine. In cloud computing platform 810, multiple servers may be used to run service applications and perform data storage operations in a cluster. In particular, the servers may perform data operations independently but exposed as a single device referred to as a cluster. Each server in the cluster can be implemented as a node.

Client device 880 may be linked to a service application in cloud computing platform 810. Client device 880 may be any type of computing device, which may correspond to computing device 900 described with reference to FIG. 9, for example, client device 880 can be configured to issue commands to cloud computing platform 810. In embodiments, client device 880 may communicate with service applications through a virtual Internet Protocol (IP) and load balancer or other means that direct communication requests to designated endpoints in cloud computing platform 810.

The components of cloud computing platform 810 may communicate with each other over a network (not shown), which may include, without limitation, one or more local area networks (LANs) and/or wide area networks (WANs).

Example Distributed Computing Environment

Figure 9:
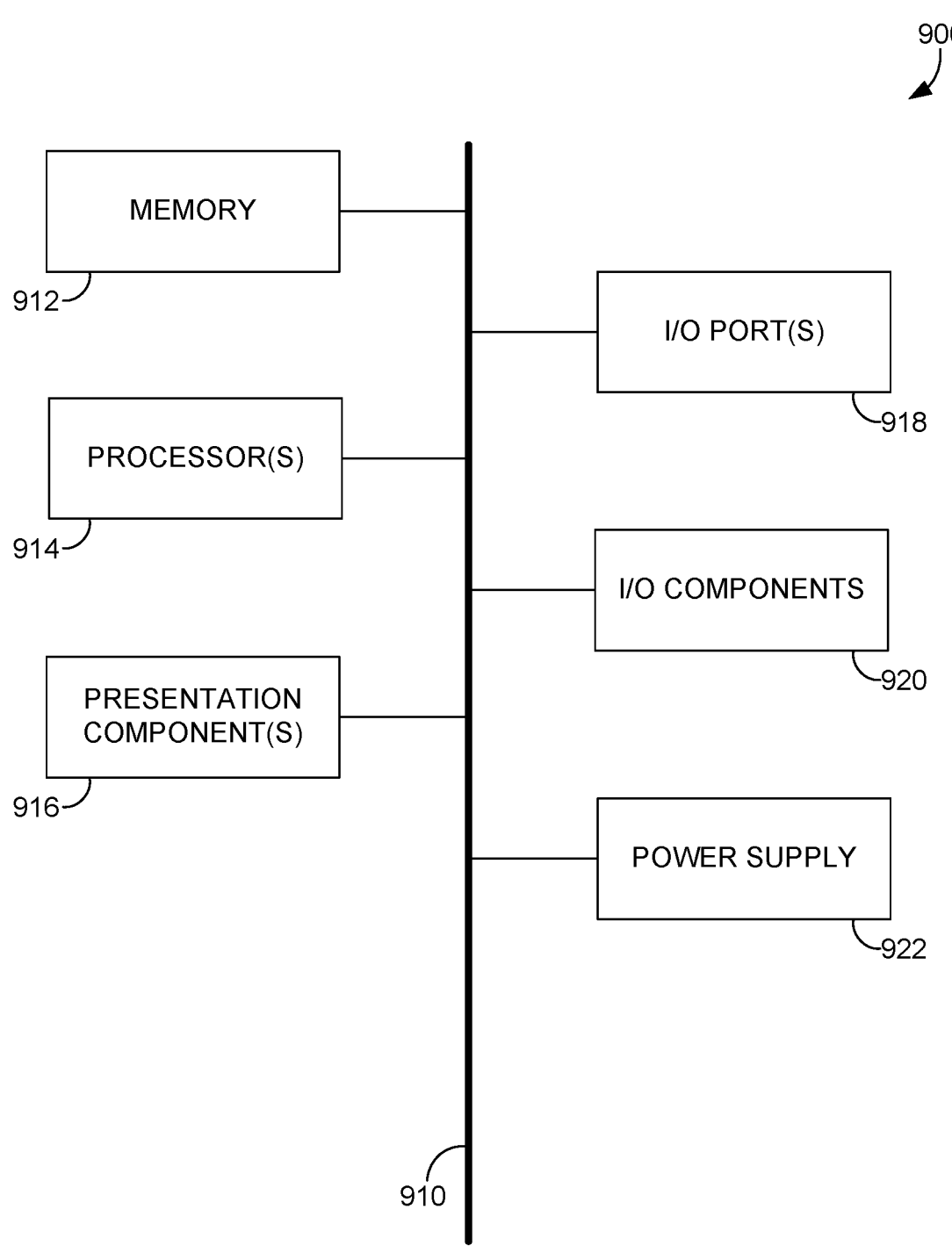
FIG. 9 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 9 in particular, an example operating environment for implementing embodiments of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more buses (such as an address bus, data bus, or combination thereof). The various blocks of FIG. 9 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 9 is merely illustrative of an example computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, the method comprising:

transmitting an input signal through an intermediate medium and through an object associated with the intermediate medium;

in response to transmitting the input signal, detecting, via a sensor, an aggregate object-intermediate-medium sound;

generating an acoustic signature corresponding to aggregate object-intermediate medium sound;

accessing a reference acoustic signature corresponding to the object and the intermediate medium;

comparing the reference acoustic signature to the acoustic signature to generate a quantified difference between the reference acoustic signature and the acoustic signature; and communicating an indication of an integrity of the object based on the quantified difference between the reference acoustic signature and the acoustic signature.

2. The method of claim 1, wherein the input signal is an input signal that is transmitted via a transducer that is physically attached to the intermediate medium, wherein the transducer is not physically attached to the object.

3. The method of claim 2, wherein the transducer is physically attached to an optimal location associated with the intermediate medium, wherein the optimal location is determined based on:

determining a location of the intermediate medium using a camera;

detecting a location of the object within the intermediate medium using a radar; and based on the location intermediate medium and the location of the object, determining the optimal location for physically attaching the transducer to the intermediate medium, wherein the optimal location is a location identified for maximum energy transfer from the transducer to the intermediate medium and the object.

4. The method of claim 1, wherein the object comprises a fragile material having a noise reduction coefficient measurement below a threshold, wherein the intermediate medium comprises a material that is transparent to mm-waves, and wherein the aggregate object-intermediate-medium sound comprises a frequency response of the fragile material of the object to the input signal.

5. The method of claim 1, wherein the reference acoustic signature and the acoustic signature are generated, using an acoustic signature computation model, based on acoustic responses in a frequency domain, mean measurements, and standard deviation measurements for corresponding input signals.

6. The method of claim 1, wherein generating the quantified difference is between the reference acoustic signature and the acoustic signature based on determining a distance metric associated with a difference between a mean frequency for the acoustic signature and a mean frequency for the reference acoustic signature.

7. The method of claim 6, the method further comprising determining that the object has an impaired integrity is based a threshold, wherein the threshold is based on the distance metric and individual channel measurements used to generate the reference acoustic signature.

8. A computerized system, the system comprising:

one or more computer processors; and computer memory storing computer-useable instructions that, when used by the one or more computer processors, cause the one or more computer processors to perform operations comprising:

receiving, via a first multi-location object integrity sensing client, a first acoustic signature associated with a package comprising an object in an intermediate medium;

receiving, via a second multi-location object integrity sensing client, a second acoustic signature associated with the package;

accessing a reference acoustic signature corresponding to the object and the intermediate medium;

comparing, via an object integrity with location computation model, the reference acoustic signature to the first acoustic signature and the second acoustic signature to generate a quantified difference between the reference acoustic signature and the first acoustic signature and a quantified difference between the reference acoustic signature and the second acoustic signature, respectively; and based on the quantified difference between the reference acoustic signature and the first acoustic signature and the quantified difference between the reference acoustic signature and the second acoustic signature, communicating a first indication of an integrity of the object at a first location or a second indication of an integrity of the object at a second location.

9. The system of claim 8, wherein the first acoustic signature and the second acoustic signature are associated with corresponding input signals, wherein input signals are transmitted via transducers that are physically attached to the intermediate medium, wherein the transducer is not physically attached to the object.

10. The system of claim 8, wherein the first indication of the integrity of the object is associated with an identifier of the first location and the second indication of the integrity of the object is associated with an identifier of the second location.

11. The system of claim 8, wherein the object comprises a fragile material having a noise reduction coefficient measurement below a threshold, wherein the intermediate medium comprises a material that is transparent to mm-waves, and wherein the first acoustic signature associated with the package comprising the object in the intermediate medium comprises a frequency response of the fragile material of the object to the input signal.

12. The system of claim 8, wherein the reference acoustic signature is generated, using an acoustic signature computation model, based on acoustic responses in a frequency domain, mean measurements, and standard deviation measurements for corresponding input signals.

13. The system of claim 8, wherein generating the quantified difference is based on determining a distance metric associated with a difference between a mean frequency for the first acoustic signature and a mean frequency for the reference acoustic signature and a difference between a mean frequency for the second acoustic signature and the mean frequency for the reference acoustic signature.

14. The system of claim 13, wherein the first indication or the second indication indicates that the object has an impaired integrity is based on a threshold, wherein the threshold is based on the distance metric and individual channel measurements used to generate the reference acoustic signature.

15. One or more computer-storage media having computer-executable instructions embodied thereon that, when executed by a computing system having a processor, and memory, cause the processor to:

accessing an acoustic signature corresponding to an object associated with an intermediate medium;

accessing a reference acoustic signature corresponding to the object and the intermediate medium;

comparing the reference acoustic signature to the acoustic signature to generate a quantified difference between the reference acoustic signature and the acoustic signature; and communicating an indication of an integrity of the object based on the quantified difference between the reference acoustic signature and the acoustic signature.

16. The media of claim 15, wherein the reference acoustic signature is generated, using an acoustic signature computation model, based on acoustic responses in a frequency domain, mean measurements, and standard deviation measurements for corresponding input signals.

17. The media of claim 16, further comprising an acoustic signature comparison computation model that operates based on a similarity metric and a clustering algorithm that are used to determine the difference between the quantified difference between the reference acoustic signature and the acoustic signature and a threshold for determining that the object is impaired.

18. The media of claim 17, where the acoustic signature comparison computation model is configured to process reference acoustic signature features and acoustic signature features to determine the difference between the quantified difference between the reference acoustic signature and the acoustic signature and a threshold for determining that the object is impaired.

19. The media of claim 18, wherein generating the quantified difference between the reference acoustic signature and the acoustic signature is based on determining a distance metric using a difference between a mean frequency for the acoustic signature and a mean frequency for the reference acoustic signature.

20. The media of claim 19, wherein the indication indicates that the object has an impaired integrity based on a threshold, wherein the threshold is based on the distance metric and individual channel measurements used to generate the reference acoustic signature.

* * * * *